(12) United States Patent
Arakawa

(10) Patent No.: US 8,098,128 B2
(45) Date of Patent: Jan. 17, 2012

(54) LOCK CONTROL SYSTEM AND METHOD FOR WORKING MACHINE, WORKING MACHINE, LOCK CONTROL DEVICE AND LOCK CONTROL MANAGEMENT DEVICE FOR WORKING MACHINE

(75) Inventor: Shuji Arakawa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 979 days.

(21) Appl. No.: 11/793,615

(22) PCT Filed: Jan. 6, 2006

(86) PCT No.: PCT/JP2006/300109
§ 371 (c)(1),
(2), (4) Date: Jun. 21, 2007

(87) PCT Pub. No.: WO2006/075562
PCT Pub. Date: Jul. 20, 2006

(65) Prior Publication Data
US 2008/0150677 A1 Jun. 26, 2008

(30) Foreign Application Priority Data
Jan. 11, 2005 (JP) .................................. 2005-003434

(51) Int. Cl.
*G05B 19/00* (2006.01)
(52) U.S. Cl. ..................................... 340/5.2; 340/426.11
(58) Field of Classification Search .......................... None
See application file for complete search history.

(56) References Cited

U.S. PATENT DOCUMENTS

| 4,852,680 | A |   | 8/1989  | Brown et al. |
| 4,991,683 | A |   | 2/1991  | Garretto et al. |
| 5,060,263 | A | * | 10/1991 | Bosen et al. .................. 713/184 |
| 5,414,418 | A | * | 5/1995  | Andros, Jr. ..................... 340/7.4 |
| 5,547,039 | A |   | 8/1996  | Berger et al. |

(Continued)

FOREIGN PATENT DOCUMENTS
CN 1462246 12/2003
(Continued)

OTHER PUBLICATIONS

Office Action dated Oct. 24, 2008 in corresponding Chinese patent application No. 200680002004.7 (and English translation).

(Continued)

*Primary Examiner* — Jennifer Mehmood
*Assistant Examiner* — Brian Wilson
(74) *Attorney, Agent, or Firm* — Posz Law Group, PLC

(57) ABSTRACT

The lock control system of the present invention makes it possible to perform lock control of a working machine both by remote actuation and by local actuation, so that the convenience of use and so on is enhanced. A lock setting device 140 is provided to the working machine. The lock setting device 140 is provided with a user password storage unit 144, a manager password storage unit 145, and a one-time password storage unit 146. The user is able to perform lock setting and release by local actuation using the user password. A maintenance person is able to perform lock setting and release by local actuation using the one-time password. And lock setting and release can also be performed by remote actuation via a satellite communication network. It is possible to perform lock setting and release by selecting the appropriate method for each individual scenario.

12 Claims, 21 Drawing Sheets

U.S. PATENT DOCUMENTS

| | | | |
|---|---|---|---|
| 5,632,190 A * | 5/1997 | Sunamura et al. | 91/459 |
| 5,969,633 A * | 10/1999 | Rosler | 340/5.25 |
| 6,236,120 B1 | 5/2001 | Loraas et al. | |
| 6,930,917 B2 * | 8/2005 | Novac et al. | 365/185.05 |
| 6,968,998 B2 | 11/2005 | Daniel et al. | |
| 7,177,738 B2 | 2/2007 | Diaz | |
| 7,183,666 B2 | 2/2007 | Arakawa et al. | |
| 7,388,471 B2 | 6/2008 | Scheer et al. | |
| 7,394,347 B2 | 7/2008 | Kady | |
| 7,394,352 B2 | 7/2008 | Bell et al. | |
| 2002/0059146 A1 * | 5/2002 | Keech | 705/64 |
| 2003/0125836 A1 | 7/2003 | Chirnomas | |
| 2003/0137398 A1 * | 7/2003 | Shibata et al. | 340/5.61 |
| 2004/0145241 A1 * | 7/2004 | Arakawa et al. | 307/10.3 |
| 2004/0164848 A1 * | 8/2004 | Hwang et al. | 340/5.82 |
| 2004/0210380 A1 * | 10/2004 | Morita et al. | 701/200 |
| 2005/0044906 A1 * | 3/2005 | Spielman | 70/63 |
| 2005/0177744 A1 * | 8/2005 | Herman | 713/200 |

FOREIGN PATENT DOCUMENTS

| | | |
|---|---|---|
| EP | 0 857 629 A2 | 8/1998 |
| EP | 1 440 855 A1 | 7/2004 |
| JP | A-63-155915 | 6/1988 |
| JP | A-2000-034746 | 2/2000 |
| JP | A-2000-255382 | 9/2000 |
| JP | A-2002-264786 | 9/2002 |
| JP | A-2003-040081 | 2/2003 |
| JP | A-2003-137066 | 5/2003 |
| JP | A-2003-161199 | 6/2003 |
| JP | A-2004-74832 | 3/2004 |
| JP | A-2004-114893 | 4/2004 |
| WO | WO 02/079010 | 10/2002 |

OTHER PUBLICATIONS

U.S. Appl. No. 11/793,599, filed Jun. 21, 2007, Arakawa.

European Search Report dated Oct. 23, 2008 in corresponding European patent application No. 06711492.06-2421 (and English translation).

European Search Report dated Oct. 21, 2008 in corresponding European patent application No. 06702053.07-2421 (and English translation).

Office Action dated Jul. 21, 2010 from U.S. Patent Office in related U.S. Appl. No. 11/793,599.

* cited by examiner

FIG. 6

| WORKING DEVICE MANAGEMENT TABLE (SERVER) T1 ||||||
|---|---|---|---|---|---|
| USER ID | USER NAME | MACHINE ID | WORKING DEVICE TITLE | ONE-TIME PW | STATE OF LOCKING |
| UID01 | AAA | MID01 | HYDRAULIC SHOVEL | OTPW01 | OFF |
| | | MID02 | WHEEL LOADER | OTPW02 | OFF |
| | | ... | ... | ... | ... |
| | | MID0n | BULLDOZER | OTPW0n | OFF |
| UID02 | BBB | MID11 | DUMP TRUCK | OTPW11 | OFF |
| | | MID12 | HYDRAULIC SHOVEL | OTPW12 | OFF |
| | | ... | ... | ... | ... |
| | | MID1n | CRANE | OTPW1n | ON |
| ... | ... | ... | ... | ... | ... |

WORKING DEVICE MANAGEMENT TABLE (BANK TERMINAL) T2

| USER ID | USER NAME | MACHINE ID | WORKING DEVICE TITLE | UTILIZATION RATE | PAYMENT BALANCE | MORTGAGE SETTING | STATE OF LOCKING |
|---------|-----------|------------|----------------------|------------------|-----------------|------------------|------------------|
| UID01 | AAA | MID01 | HYDRAULIC SHOVEL | 97% | ¥*** | YES | OFF |
| | | MID02 | WHEEL LOADER | 92% | ¥*** | YES | OFF |
| | | ... | ... | ... | ... | ... | ... |
| | | MID0n | BULLDOZER | 95% | ¥*** | YES | OFF |
| UID02 | BBB | MID11 | DUMP TRUCK | 63% | ¥*** | YES | OFF |
| | | MID12 | HYDRAULIC SHOVEL | 58% | ¥*** | YES | OFF |
| | | ... | ... | ... | ... | ... | ... |
| | | MID1n | CRANE | 7% | ¥*** | YES | ON |
| ... | ... | ... | ... | ... | ... | ... | ... |

LOCK CONTROL SYSTEM AND METHOD FOR WORKING MACHINE, WORKING MACHINE, LOCK CONTROL DEVICE AND LOCK CONTROL MANAGEMENT DEVICE FOR WORKING MACHINE

FIELD

The present invention relates to a lock control system for a working machine, to a lock control method for a working machine, and to a working machine.

BACKGROUND

As working machines, various types of construction machine are known, such as for example hydraulic shovels and wheel loaders and the like, as well as haulage vehicles and the like such as dump trucks and so on. These working machines can easily become objects of theft, since they are of comparatively high price, and since moreover they are often used at workplaces which are far from human habitation.

Accordingly, a theft prevention technique has been proposed (in Patent Document #1), in which it is arranged to permit starting of the engine, only if a region in which the working machine can be used is set up in advance, and if moreover the user has inputted a predetermined secret security number to the working machine.

Patent Document #1: Japanese Laid-Open Patent Publication 2004-114893.

SUMMARY

Problem

According to the prior art technique described in the above document, even if for example the working machine is stolen, it cannot be taken out from the designated region and used, so that the anti-theft characteristic is enhanced. However, it is not possible to control the theft prevention function if the user has undesirably forgotten the secret security number, and accordingly the convenience of use is poor.

Furthermore, sometimes a user who is a debtor may cause the theft prevention function to operate intentionally, in order, for example, to escape forcible retrieval of the working machine by a creditor. In this case, it is not possible to put this working machine into operation without extracting the secret number from the user. Accordingly, the creditor is not able to operate the working machine upon which he has a lien, so that he is not able to implement retrieval of his claim.

It should be understood that an anti-theft technique has also been contemplated, in which the operation of a working machine can be forcibly stopped by remote actuation. However, if the working machine is present in a location to which radio waves cannot penetrate, such as for example in a tunnel or a mountainous region or the like, then it is not possible to perform such remote actuation.

The present invention has been conceived in consideration of the problems described above, and one objective thereof is to provide a lock control system for a working machine, a lock control method for a working machine, and a working machine, with which it is possible to control the operation of a working machine by integrating local actuation upon the working machine side, and remote actuation from externally to the working machine, so that it is possible to enhance the convenience of use. Accordingly, one objective of the present invention is to provide a lock control system for a working machine, a lock control method for a working machine, and a working machine, with which it is possible to restrict the function of the working machine both from within and from outside the working machine, and with which it is arranged to be able to cancel this functional restriction by a plurality of methods. Yet further objectives of the present invention will become clear from the following description of the embodiments thereof.

Means for Solution

According to one aspect of the present invention, a system for performing lock control of a working machine includes a working machine and a management device which are connected via a communication network so as to be capable of mutual communication. The working machine includes: an input means for inputting information; a first communication means which performs mutual communication with the management device via the communication network; and a control means which restricts the operation of the working machine, or releases this operational restriction, based upon either or both of information which has been inputted from the management device via the first communication means, and information which has been inputted from the input means. And the management device includes: a second communication means which performs mutual communication with the working machine via the communication network; a lock setting means which transmits information for restricting the operation of the working machine, via the second communication means, to the working machine; and a lock release means which transmits to the working machine a signal for releasing an operational restriction which has been set, via the second communication means.

In a preferred embodiment, the control means includes: a first password storage means which stores first password information for comparison with information inputted from the input means; a second password storage means which stores second password information for comparison with information inputted from the input means; and a third password storage means which stores third password information for comparison with information inputted from the management device. And the control means executes the lock control, if information which has been inputted from the input means matches at least either one of the first password information and the second password information; and executes the lock control, if information which has been inputted from the management device matches the third password information.

It should be understood that it would also be acceptable to arrange for priorities to be set in advance between the first password, the second password, and the third password. For example, a structure might also be implemented in which the third password might be accorded a position which is superior to the first password, so that, if the locked state has been set with the third password, it is not possible to release this locked state with the first password.

Moreover, by according to the second password a position which is superior to the first password and to the second password, the convenience of use may also be enhanced.

In a preferred embodiment, the second password information is one-time password information, and there is further included a second password rewriting means for, if the second password information which is stored in the second password storage means has been used, rewriting the used second password information with new second password information.

In a preferred embodiment, the second password information is one-time password information, and there is further included a second password deletion means for, if the second password information which is stored in the second password storage means has been used, deleting the used second password information.

In a preferred embodiment, the control means includes a second password rewriting means, and, if the second password information which is stored in the second password storage means has been used, the second password rewriting means rewrites the used second password information to new second password information.

In a preferred embodiment, the control means includes a second password deletion means and a second password rewriting means, and:

if the second password information which is stored in the second password storage means has been used, the second password deletion means deletes the used second password information; and, if an issuance request for the second password information has been inputted from the input means, the second password rewriting means generates new second password information according to a predetermined generating conditional expression which has been set in advance, and stores this new second password information in the second password storage means.

In a preferred embodiment, the control means decides that an issuance request for the second password information has been inputted, if information other than information which is registered in advance in the control means has been inputted via the input means.

In a preferred embodiment, the management device includes a second password rewriting means; and this second password rewriting means, upon receipt from the control means via the communication network of information to the effect that the second password information which is stored in the second password storage means has been used, generates new second password information, transmits this new second password information which has been generated via the communication network to the control means, and causes it to be stored in the second password storage unit.

In a preferred embodiment, the management device includes: a reset means for resetting the first password information which is stored in the first password storage means to its initial value; and an update means which updates the second password information which is stored in the second password storage means to new second password information. And the control means, based upon a command from the reset means, resets the first password information which is stored in the first password storage means to the initial value; and, based upon a command from the update means, updates the second password information which is stored in the second password storage means to new second password information.

In a preferred embodiment, the control means, as the lock control, sets the working machine to either one of a locked state in which the operation of the working machine is made impossible or the operation which it is capable of executing is restricted, and an unlocked state in which this locked state is released.

In a preferred embodiment, the first password information is information which can be used repeatedly a plurality of times for the lock control, and the second password information is information which changes each time the lock control is performed.

According to another aspect of the present invention, a method for performing lock control of a working machine which is connected to a management device via a communication network so as to be capable of mutual communication therewith, includes: a first locking step of setting a locked state in which the operation of the working machine is made impossible or the operation which it is capable of executing is restricted, based upon a first lock command which has been inputted from the management device via the communication network; a second locking step of setting the working machine to the locked state, based upon a second lock command which has been inputted from an input means which is provided to the working machine; a first unlocking step of releasing the locked state and setting an unlocked state, based upon a first unlock command which has been inputted from the management device via the communication network; and a second unlocking step of setting the working machine to the unlocked state, based upon a second unlock command which has been inputted from the input means. Furthermore, in the second unlocking step, the second unlocked state is set, if the second unlock command which has been inputted from the input means matches at least one of first password information and second password information which is set in advance in the working machine.

According to yet another aspect of the present invention, a working machine, which is connected to a management device via a communication network so as to be capable of communication therewith, includes: an input means for inputting information; a first communication means which performs mutual communication with the management device via the communication network; and a control means which restricts the operation of the working machine, or releases this operational restriction, based upon either or both of information which has been inputted from the management device via the first communication means, and information which has been inputted from the input means.

According to another aspect of the present invention, a system for performing lock control of a working machine includes a working machine and a management device which are connected via a communication network so as to be capable of mutual communication. The working machine includes: a communication means for connecting to the management device via the communication network; a password storage means for storing password information which is used for lock control; a used notification means which, if the password information has been used, transmits from the communication means via the communication network to the management device a used notification which specifies the fact that the password information has been used; and a rewriting means which, if new password information has been received from the management device via the communication network, rewrites the password information which is stored in the password storage means to the new password information. And the management device includes: a communication means for connecting to the working machine via the communication network; a password generation means which generates the new password information if the used notification has been received from the working machine; and a password transmission means which transmits the new password information which has been generated from the communication means via the communication network to the working machine.

According to another aspect of the present invention, a system for performing lock control of a working machine, includes a working machine and a management device which are connected via a communication network so as to be capable of mutual communication. The working machine includes: a password storage means for storing password information which is used for lock control; a password deletion means for, if the password information which is stored in the password storage means has been used, deleting the used password information; and a password generation means which, if an issuance request for password information has been inputted, generates new password information according to a predetermined generating conditional expression which is set in advance, and stores this new password information in the password storage means. And the management device includes a password generation means which, if a request has been made, generates new password information according to the same generating conditional expression as the predetermined generating conditional expression.

In a preferred embodiment, the password generation means decides that an issuance request for the password information has been inputted, if information other than information which is registered in advance has been inputted.

In a preferred embodiment, the management device comprises a notification means for notifying the new password information which has been generated.

According to yet another aspect of the present invention, a device for performing lock control for a working machine includes: a communication means which performs mutual communication with a management device via a communication network; a lock control means which, based upon a command which has been inputted, sets either a locked state or an unlocked state of the working machine; a password storage means for storing a password for releasing the state of locking by the lock control means; a password comparison means which compares together a password which has been inputted from a password input means and the password which is stored in the password storage means, and, if the passwords agree with one another, issues a command to the lock control means to set it from the locked state into the unlocked state; a used notification means which, if the password which is stored in the password storage means has been used, transmits from the communication means via the communication network to the management device a used notification which specifies the fact that the password has been used; and a rewriting means which, if a new password has been received from the management device via the communication network, rewrites the password which is stored in the password storage means to the new password.

According to yet another aspect of the present invention, a management device for performing lock control for a working machine includes: a communication means for performing mutual communication with the working machine; and a password generation means which generates a password which is used by the working machine; and, when a password issuance request has been received from the working machine via the communication means, a new password is generated by the password generation means, and this new password is transmitted to the working machine via the communication means.

Benefits

Since, according to the present invention, it is possible to restrict the operation of the working machine, or to release this operational restriction, from either one or both of an input means which is provided to the working machine, or a management device which is connected to the working machine via a communication network, accordingly the convenience of use is enhanced. That is to say, even if the operation of the working machine has been restricted using the input means, still it is possible to release this restriction by remote actuation from the management device; and, conversely, even if an operational restriction has been set for the working machine by remote actuation from the management device, still it is possible to release this restriction from the input means.

It is possible to input either of two types of password information from the input means, the first password information and the second password information. If either one of the first password information or the second password information which has been inputted from the input means matches, then it is possible to perform lock control of the working machine. Accordingly, for example, if the first password information is made to be information which can be freely set by the user, and the second password information is managed by a predetermined institution such as the vendor of the working machine or a bank or the like, then it is possible for an operational restriction which has been set by the user to be released by a person who has been dispatched from the predetermined institution, so that it is possible to perform forcible retrieval of the working machine, or the like.

According to the present invention, each time the password is used by the working machine, it is possible to generate a new password by the management device, and to rewrite the password which is stored in the working machine to the new password. Accordingly, it is possible to control the locked state of the working machine with a so called throwaway password, so that the convenience of use is enhanced.

DRAWINGS

FIG. 6 is an explanatory figure showing a working device management table which is managed on the server side;

FIG. 22 is a flow chart showing processing by which the server notifies this new one-time password to a user at his place of work or the like.

SYMBOLS

Figure 1:
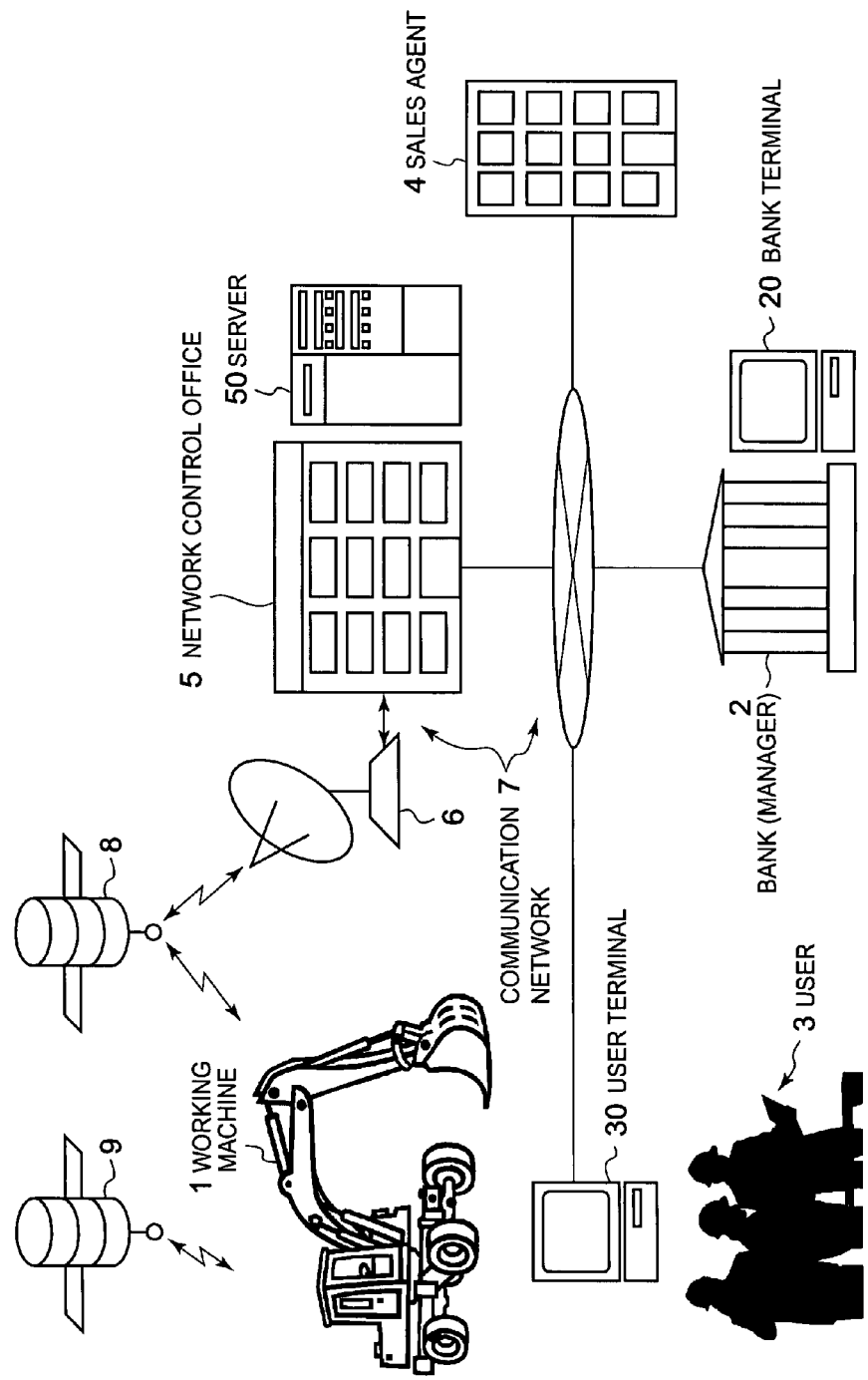
FIG. 1 is an explanatory figure showing the overall structure of a system according to an embodiment of the present invention.

1: working machine, 2: bank, 3: user, 4: sales agent, 5: network control office, 6: satellite earth station, 7: communication network, 8: communication satellite, 9: GPS satellite, 20: bank terminal, 21: communication control unit, 22: calculation processing unit, 22A: operational condition setting processing, 22B: operational information reception processing, 22C: operational state decision processing, 22D: working machine constraint processing determination processing [sic], 22D: working machine constraint determination processing, 22E: working machine constraint release processing, 23: storage unit, 23A: program storage unit, 23B: data base main section, 24: user interface unit, 30: user terminal, 50: server, 51: communication control unit, 52: calculation processing unit, 52A: operational information reception processing, 52B: operational information transfer processing, 52C: lock setting processing, 52D: lock release processing, 52E: resetting processing, 52F: one-time password issuance processing, 53: storage unit, 53A: program storage unit, 53B: data base, 100: electronic controller, 110: communication controller, 111: storage device, 120: GPS sensor, 121: GPS antenna, 130: satellite communication terminal, 131: satellite communication antenna, 140: lock setting device, 141: lock setting storage unit, 142: comparison unit, 143: lock control unit, 144: user password storage unit, 145: manager password storage unit, 146: one-time password storage unit, 147: one-time password management unit, 147A: one-time password deletion unit, 147B: one-time password generation unit, 148: time instant information generation unit, 149: device number storage unit, 150: user interface unit, 151: display unit, 152: input unit, 153: external device, 160: service meter, 170: engine, 171: engine starter, 180: engine key, 181: engine key switch, T1: working device management table (server side), T2: working device management table (bank terminal side).

EMBODIMENTS

In the following, embodiments of the present invention will be explained in detail with reference to the figures. As explained below, in these embodiments, lock control of the working machine 1 may be performed by remote actuation from a server 50, and may also be performed via an input unit 152 (FIG. 3) which is provided within the working machine 1.

It should be understood that, as described hereinafter along with FIG. 19, it may also be arranged to provide to the input unit 152 a communication function for performing data communication via cable or wireless with an external device 153 (refer to FIG. 19), and, via this communication function, it may also be arranged to make it possible to input a password from the external device 153. As this external device 153, for example, a portable telephone, a portable information terminal, a personal computer, an ID card, a memory card, a wireless tag or the like may be cited. That is, the external device 153 should, at least, be endowed with a storage function for storing a password and the like, and a communication function for performing communication with the communication function of the input unit 152.

By making it possible to input a password via this external device 153, for example, it is possible for the operator or the like not to perform manual actuation of the keyboard switches of the input unit 152, but instead to perform lock control by inputting a password to the working machine 1 automatically, so that it is possible to prevent the occurrence of input mistakes and the convenience is enhanced. This external device 153 may also, for example, be termed a password input means for inputting a password automatically.

In the following explanation, sometimes the case of performing lock control by a command from the server 50 will be termed "remote actuation" ("remote lock control"), and sometimes the case of performing lock control by information which is inputted from the input unit 152 will be termed "local actuation" ("local lock control").

As described hereinafter, with this system, it is arranged for it to be possible to perform local actuation independently via a plurality of routes. In one of these routes, a user password which is managed by the user 3 of the working machine 1 is employed. In another of these routes, a one-time password which is managed by the vendor or the like of the working machine 1 is employed.

In this lock control, there are included both processing for setting the working machine 1 to its locked state, and processing for releasing the locked state and setting the machine 1 to its unlocked state. Here, by the locked state is meant a state in which, for example, it is made to be either completely or partially impossible for some or all of the sections of the working machine 1 to execute their operation. Furthermore, the unlocked state means a state in which, for example, the locked state which has been set to the working machine 1 has been cancelled.

Yet further, with this system, it is arranged for it to be possible for a bank (manager) 2 who has lent money to the user 3 to be able remotely to monitor the operational state of the working machine 1 employed by the user 3. Due to this, the bank 2 is able to make an inference as to the business circumstances of the user 3.

For example, when the user 3 purchases the working machine 1 from a sales agent 4, he may receive a loan from the bank 2 by pledging the working machine 1 as security. A duty may be imposed upon the user 3 to repay, for example, a predetermined amount to the bank 2 each month.

By remotely managing the operational state of the working machine 1, the bank 2 is able to monitor whether or not the business of the user 3 who is using the working machine 1 is prospering. And if, for example, the utilization rate of the working machine 1 decreases remarkably, and a strong fear has arisen as to the user's ability to make repayments, or the like, then the bank 2 is able to put the working machine 1 forcibly into the locked state by remote actuation. Due to this, it is possible to prevent the user from making off with the working machine 1 before it even happens, and it is possible to levy distraint upon the working machine 1 in a simple and easy manner. This remote actuation may be performed from a bank terminal 20 via the server 50.

Embodiment 1

The first embodiment of the present invention will now be explained. FIG. 1 is an overall system diagram. As shown in FIG. 1, this lock control system may be built to include a working machine 1, a server 50 which is provided in a network control office on the side of the working machine maker, a bank terminal 20 which is provided upon the side of a bank 2, a user terminal 30 which is provided upon the side of a user 3, and a communication network 7 which connects these together.

Here, the communication network 7 is built to include a satellite communication circuit which connects together the working machine 1 and a satellite earth station 6 via a communication satellite 8, a dedicated ground communication circuit which connects together the satellite earth station 6 and the server 50 of the network control office 5, a computer network such as an intranet or the internet or the like which connects together the server 50 and the user terminal 30 of the bank terminal 20, and the like.

Furthermore, a terminal or the like of a sales agent 4 who sells the working machine 1 is also connected to the above described computer network. The server 50 and the bank terminal 20 can, in cooperation, monitor the operational state of the working machine 1, and moreover can perform lock control thereof. The server 50 can also perform lock control of the working machine 1 by itself. Although the server 50 may be referred to by the term "management device", according to circumstances, the server 50 and the bank terminal 20 may be referred to as the "management device".

The satellite communication circuit is employed with the objective of enabling communication between the working machine 1 and the management device, in whatever place the working machine 1 may be located. Provided that the same objective is attained, instead of a satellite communication circuit, it would also be acceptable to employ some other mobile communication network or wireless communication network. Naturally, for example, if the working machine 1 is located in a region in which it is difficult to receive radio waves, such as a mountainous region or a tunnel, then it is not possible to perform remote actuation from the management device. In this case, it is possible to perform lock control by local actuation.

It should be understood that although only one each of the working machine 1, the bank terminal 20, and the user terminal 30 is shown in the figure, in actuality, it is possible to provide a large number of each of these. This large number of working machines 1 may include, for example, construction machines such as hydraulic shovels, wheel loaders, bulldozers, motor graders, cranes, and the like, haulage vehicles such as dump trucks and the like, and industrial machinery such as various types of crushers and generators and the like. It would be acceptable to provide one server 50, or a plurality thereof. By performing integrated processing with one server 50, or distributed processing with a plurality thereof, it is possible to monitor a large number of working machines 1, and to perform supply of information to various bank terminals 20 and to various user terminals 30.

For the bank terminal 20 and the user terminal 30, for example, personal computers or work stations or portable information terminals (including portable telephones) or the like may be used. Various types of application software may be executed over OS (Operating Systems) by these terminals 20, 30. As application software, for example, there may be cited a web browser for displaying web pages supplied from the server 50, or an electronic mailer which performs transmission and reception of electronic mail, or the like.

Figure 2:
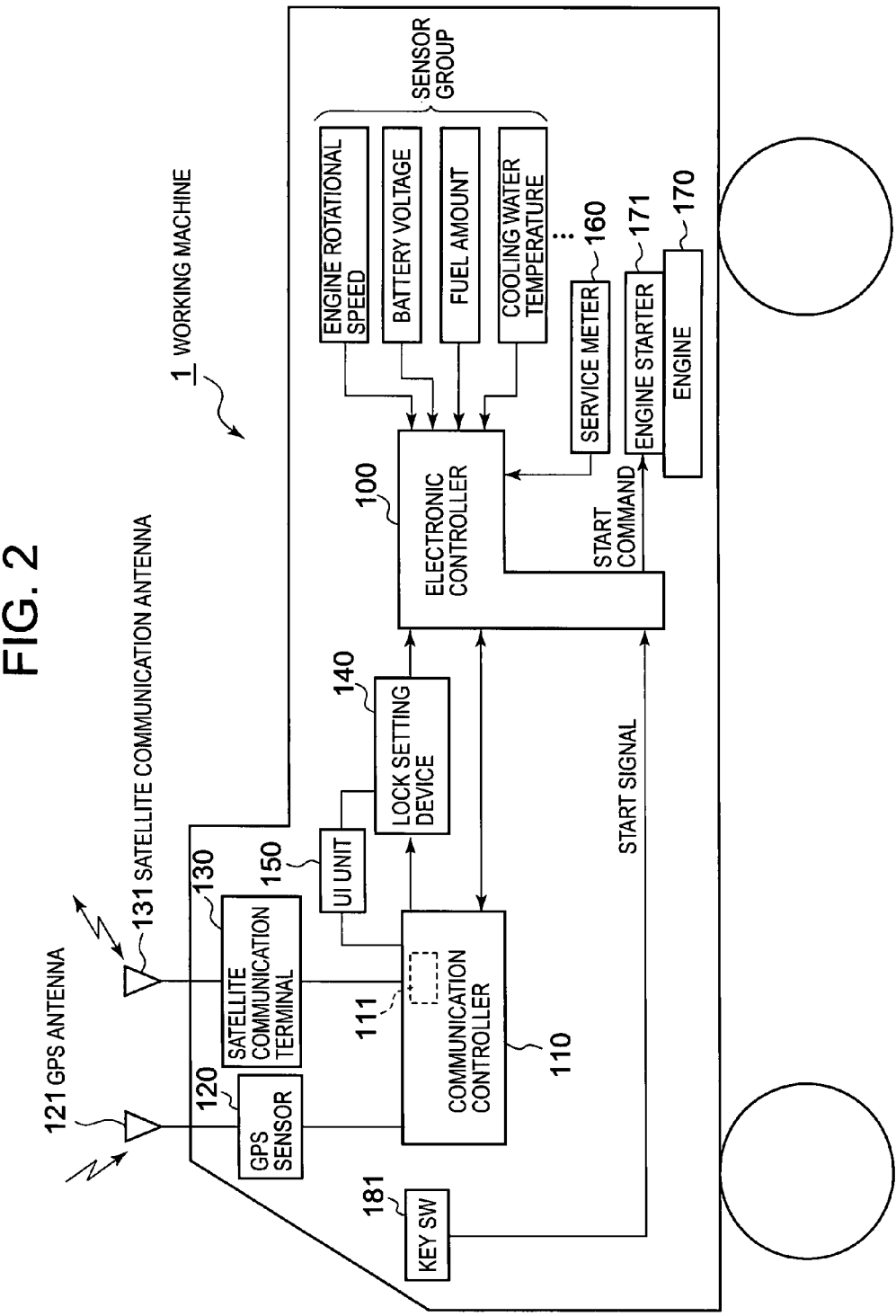
FIG. 2 is a block diagram showing the functional structure of a working machine.

FIG. 2 is a block diagram showing the functional structure of the working machine 1. This working machine 1, for example, may be built to comprise an electronic controller 100, a communication controller 110, a GPS (Global Positioning System) 120, a satellite communication terminal 130, a lock setting device 140, a UI (User Interface) unit 150, a service meter 160, a plurality of sensors, and the like. All or some of these various units may be mutually connected together via one or a plurality of in-vehicle networks. Furthermore, a plurality of these functions or circuits may be collected into one—so that, for example, the electronic controller 100 and the communication controller 110 may be integrated together, or the lock setting device 140 and the electronic controller 100 may be integrated together, or the like.

Each of the communication controller 110, the lock setting device 140, the service meter 160, and the various types of sensor in the group may be connected to the electronic controller 100. It should be understood that the UI unit 150 may also be connected to the electronic controller 100.

The electronic controller 100 is connected to various sensors which are fitted to various structural elements of the working machine 1 (for example to the engine, the battery, the fuel tank, the radiator, and the like). As these sensors, for example, a service meter (a sensor which measures and integrates the operational time) 160, an engine rotational speed sensor, a battery voltage sensor, a fuel amount sensor, a cooling water sensor, and the like may be cited.

The electronic controller 100 generates information which represents the operational time period, the engine rotational speed, the battery voltage, the fuel amount, the cooling water temperature, and the like, detected by these sensor groups, and transmits this information to the communication controller 110. Information which specifies the various states and operations of the working machine 1, such as the above described operational time period and engine rotational speed and the like, will generically be termed "operational information".

Furthermore, the electronic controller 100 controls the states and the operation of the various structural elements of the working machine 1, in response to signals from the above described sensor group, or in response to control commands which are provided from the communication controller 110. One of these control commands which is provided from the communication controller 110 to the electronic controller 100 is a lock control command due to remote actuation. When the electronic controller 100 receives the above described lock command from the communication controller 110, it sets the working machine 1 to the locked state. Due to this, the working machine 1 becomes unable to move, even if the operator actuates its actuation levers or the like.

The GPS sensor 120 has a GPS antenna 121 for receiving radio waves from the GPS satellite 9 (FIG. 1). This GPS sensor 120 measures the current position of the working machine 1, and notifies this to the communication controller 110. And the satellite communication terminal 130 has a satellite communication antenna 131 for communication with the communication satellite 8 (FIG. 1). This satellite communication terminal 130 is capable of communication with the communication controller 110 and the server 50, via the satellite communication network.

The communication controller 110 controls communication with the management device. This communication controller 110 receives the above described operational information from the electronic controller 100. Furthermore, the communication controller 110 receives positional information which specifies the current position from the GPS sensor 120. And, periodically or irregularly, the communication controller 110 transmits the above described operational information and the above described positional information to the server 50 via the satellite communication terminal 130 and the satellite communication circuit. For example, the communication controller 110 may transmit the operational information and the positional information to the server 50 in the time period band when work in the workplace has ended, or once every day. Or, the communication controller 110 may also transmit the operational information and the positional information to the server 50 on demand, according to requirements.

The server 50 stores the operational information and positional information which it has received. And, by examining the operational information which it has thus stored automatically, the server 50 is able to decide what is the level of the risk of the loan to the user 3 becoming an irrecoverable debt.

While, as described above, information regarding the various states or operations which have been detected within the working machine is included in the operational information, in particular, among this, the operational time period which is detected by the service meter 160 is taken advantage of by the server 50 as material for deciding upon the above described risk. The other information regarding the various states or operations may be employed for, for example, scheduling the maintenance of the working machine 1. If the result of the above described decision as to risk is that the risk of an irrecoverable debt is high, then the server 50 may, according to requirements, lock the working machine 1 by transmitting the above described lock control command to the working machine 1 via the satellite communication circuit.

The communication controller 110 may comprise a rewritable non-volatile storage device 111. In this storage device 111 there may be stored, for example, the user name of the working machine 1, said operational time period, the work area, and the operational history of the working machine 1 and the like. Here, by the work area, is meant the specified region for activity which is set by agreement between the user 3 and the bank 2, during the contracting process when the user receives his load from the bank 2. Setting the work area means that the bank 2 does not permit the user 3 to cake the working machine 1 outside this region for activity. This work area which has been set is not only stored in the communication controller 110 within the working machine, but is also stored by the server 50 and the bank terminal 20 as well, in correspondence with the working machine 1. The server 50 decides whether or not the working machine 1 is present outside the work area, based upon the positional information which it has received from the working machine 1. If the result is that it is decided that the working machine 1 is present outside the work area, then, according to requirements, the server 50 may lock the working machine 1 by transmitting the above described lock control command via the satellite communication circuit to the working machine 1.

Figure 3:
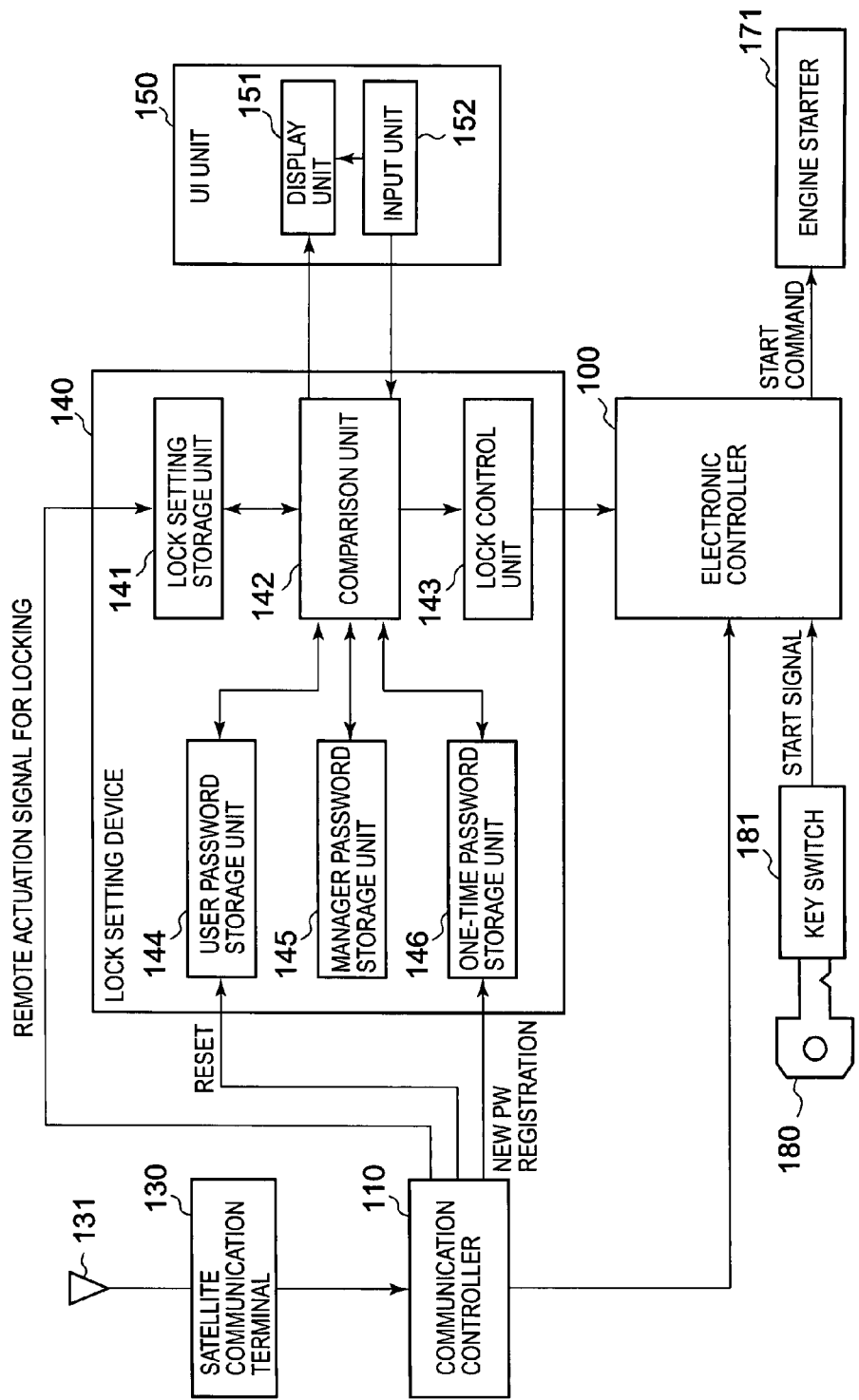
FIG. 3 is a block diagram showing the functional structure of a lock setting device.

The UI unit 150 may be connected to each of the communication controller 110 and the lock setting device 140. The UI unit 150 may be, for example, provided in the neighborhood of the driving seat of the working machine 1. As shown in FIG. 3, the UI unit 150 comprises, for example, a display unit 151 and an input unit 152.

The display unit 151 may be built from, for example, a display device such as a liquid crystal display or the like, and is used for display of maps for car navigation based upon the positional information, for display of messages, and the like. And the input unit 152, for example, may be built to include keyboard switches and a pointing device such as a mouse or the like, and is used for inputting various types of actuation command and passwords and the like. It should be understood that it would also be acceptable to arrange to use voice for information supply to the operator (which includes a person other than the user 3, such as maintenance personnel of the maker and so on), and for information input from the operator. Furthermore, the UI unit 150 may also be used for information input to the electronic controller 100, and for information output therefrom.

The lock setting device 140, for example, may be provided between the electronic controller 100 and the communication controller 110. The required commands are supplied to the electronic controller 100, since the lock setting device performs lock control either by remote actuation or by local actuation. The details of the lock setting device 140 will be described hereinafter along with FIG. 3.

An engine 170 is provided to the working machine 1. This engine 170 is started by an engine starter 171. The electronic controller 100 is present between the engine starter 171 and an engine key switch 181 (denoted by "key SW" in the figure). The engine starter 171 is operated by a control signal (a start command signal) from the electronic controller 100.

When the electronic controller 100 detects a start signal from the engine key switch 181, it outputs a start command signal to the engine starter 171. Due to this, the engine 170 starts. And, if the working machine 1 is set to the locked state, the electronic controller 100 dose not output the start command signal, even if the start signal is inputted to it.

A plurality of methods for locking the working machine 1 may be envisaged. For example, it is also possible to employ a method of cutting off the start signal from the engine key switch 181. As other lock methods, there may be cited, for example, a method of opening a battery relay which is provided between a battery and the electrical components which are fitted, a method of cutting off a pilot signal to a control valve which controls a hydraulic working device, a method of cutting off input and output command signals of a fuel injection valve for the engine, a method of keeping the control signal for a fuel injection device at a minimum value so that only idling is possible, and the like. With any of these methods, the working machine 1 may be completely stopped, or the movements of which it is capable may be restricted.

FIG. 3 is a block diagram of the lock setting device 140. This lock setting device 140 may be built to comprise, for example, a lock setting storage unit 141, a comparison unit 142, a lock control unit 143, a user password storage unit 144, a manager password storage unit 145, and a one-time password storage unit 146. When supplying commands manually to the lock setting device 140, the input unit 152 of the UI unit 150 may be employed. Instead of this, it would also be acceptable to provide a dedicated input unit and display unit to the lock setting device 140.

The lock setting device 140 may be utilized with the objective of the user 3 or an operator or maintenance personnel (hereinafter termed "an operator or the like") locking the working machine 1 manually and moreover releasing this locking, and with the objective of releasing locking which has been set by remote actuation of the type described above.

A user password which can be set by the user 3 or the operator is stored in the user password storage unit 144. By the operator or the like inputting a user password to the lock setting device 140, the locked state of the working machine 1 may be set, and its locked state which has thus been set may be cancelled. In other words, each time the correct user password is inputted, the system changes over alternatingly between the locked state and the unlocked state. The user password may be reset to its initial value by a command from the server 50.

A manager password is stored in the manager password storage unit 145. This manager password is a password which is managed by the bank 2, and, in normal circumstances at least, is not known to the user 3. The bank 2 can cause the working machine 1 to be locked by inputting the manager password to the lock setting device 140 by remote actuation.

A one-time password is stored in the one-time password storage unit 146. This one-time password is one which is managed by the vendor of the working machine 1, in other words by the server 50. This one-time password is use-once throw-away authentication information which becomes incapable of being used, directly after it has been used. Thus, the one-time password can only be used once. A new one-time password is issued from the working machine 1 itself, or from the server 50, as will be described hereinafter. This new one-time password which has thus been issued is stored in the one-time password storage unit 146.

It should be understood that the user password, the manager password, and the one-time password may, for example, be made up from a plurality of alphanumeric characters and symbols. However, instead of this text information, or along with text information, it would also be possible to utilize, for example, biometric information such as a fingerprint, a voiceprint, an iris pattern, or the like.

The lock setting storage unit 141 stores lock setting information which specifies what type of locking is currently set for this working machine 1. In this lock setting information, for example, there may be included information such as whether or not the locking has been set manually, whether the locking has been set by remote actuation from the bank terminal 20 or the server 50, and the like. If the working machine 1 has been locked manually, the lock setting device 140 stores lock setting information which specifies manual locking in the lock setting storage unit 141. By contrast, if the working machine 1 has been locked by remote actuation, the lock setting device 140 stores lock setting information which specifies locking by remote actuation in the lock setting storage unit 141.

The comparison unit 142 is a device which compares together the password which has been inputted from the input unit 152 and the user password or the one-time password, and makes a decision as to whether or not they agree with one another. For example, when a request for lock setting and a password are inputted from the input unit 152, the comparison unit 142 reads out the user password within the user password storage unit 144, and compares it with the password which has been inputted. If these passwords agree with one another, then the comparison unit 142 outputs a lock command to the lock control unit 143. Furthermore, the comparison unit 142 compares together the password which has been inputted and the one-time password, and outputs a lock command to the lock control unit 143 if they both agree with one another.

It should be understood that, for example, a "lock button" and an "unlock button" may be provided to the input unit 152, and, either before or after input of a password, the operator may be caused to select one or the other of this lock button and unlock button. Instead of this, it would also be acceptable to provide a structure in which, each time the operator or the like inputs a password, the system changes over alternatingly between the locked state and the unlocked state. In the latter case, if the working machine 1 is in the locked state, when the operator or the like inputs the correct password, the system changes from the locked state to the unlocked state. Conversely, if the working machine 1 is in the unlocked state, when the operator or the like inputs the correct password, the system changes from the unlocked state to the locked state. In this case, a command for putting the system into the locked state, and a command for putting the system into the unlocked state, are both included in the lock command. In the following explanation, for the convenience of explanation, the command for changing to the locked state will be distinguished as being the lock command, while the command for changing to the unlocked state will be distinguished as being the unlock command.

The lock control unit 143 outputs a control signal to the electronic controller 100 in response to the above described lock command. And, in response to this control signal, the electronic controller 100 sets locking by manual actuation. As already explained, a plurality of locking methods are available. For example, the electronic controller may cut off the start signal of the key switch 181. At this time, lock setting information which specifies manual locking is written into the lock setting storage unit 141.

When a request for lock release and a password are inputted from the input unit 152, the comparison unit 142 compares the password which has been inputted with the user password and the one-time password, and if there is agreement with either one thereof, it outputs a signal for release of the locking to the lock control unit 143.

It should be understood that it would also be possible to decide whether or not to permit release of the locked state, according to the type of lock setting which is specified by the lock setting information stored in the lock setting storage unit 141. For example it would also be acceptable, if the locked state has been set by remote actuation using the manager password, to arrange for it to be possible to release the locked state either by remote actuation using the manager password, or by local actuation using the one-time password. In other words it would also be possible, for locking by remote actuation, to prevent release with the user password.

On the other hand it is possible to provide a structure in which, if the type of lock setting specified by the lock setting information is manual locking, then it is possible to perform release by using any one of the user password, the manager password, or the one-time password.

Since, as has already been explained, a plurality of locking methods are available, the method for locking release may also correspond to the respective locking method.

It should be understood that, while the lock setting information is indicating that the locking is set by remote actuation, when the power supply to the working machine 1 is turned ON by actuation of, for example, the key switch 181, the lock setting device 140 is also able to display a message or a mark on the display unit which indicates that the system is locked in order to safeguard a lien. Due to this, in a case such as one in which the user 3 makes an attempt to resell the working machine 1 which is locked by remote actuation to a third party, this third party is able to know that this transaction is one which is dishonest.

Figure 4:
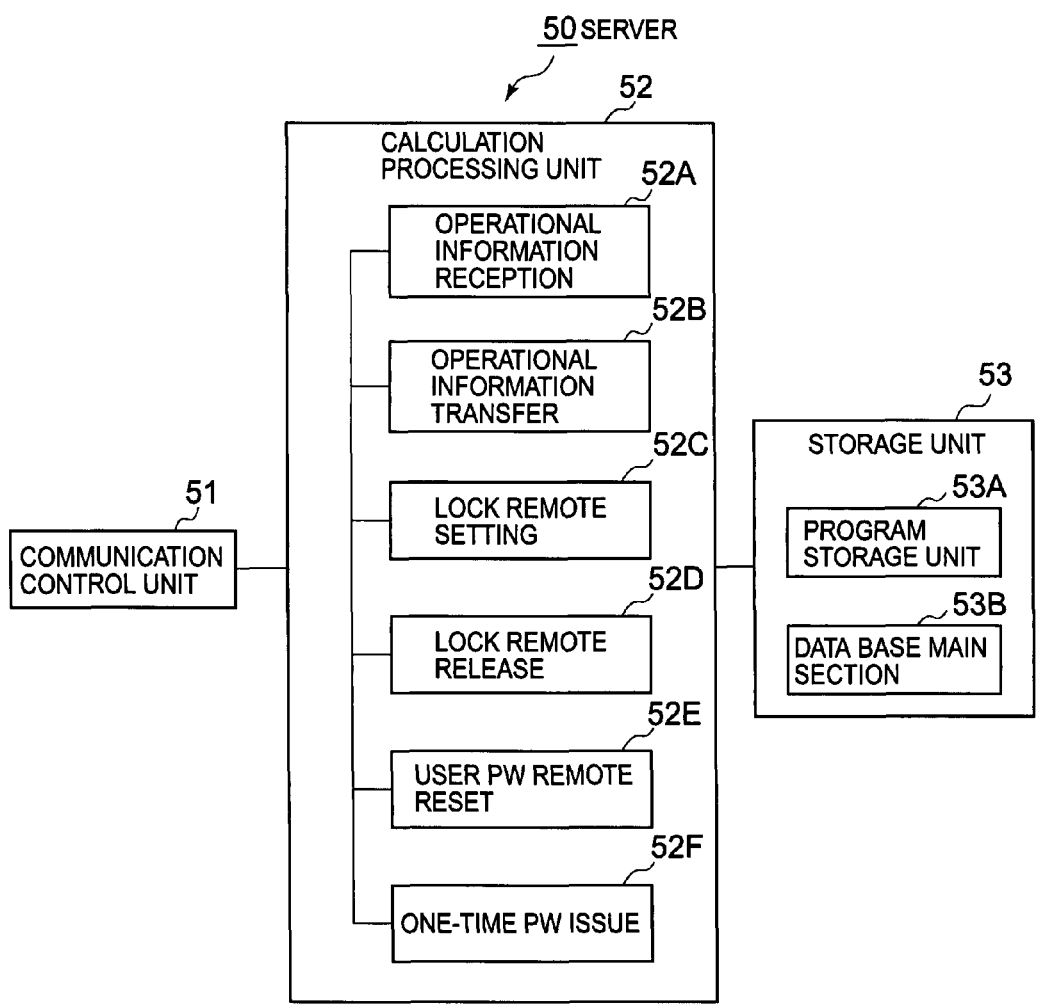
FIG. 4 is a block diagram showing the functional structure of a server.

FIG. 4 shows the functional structure of the server 50. This server 50, as already explained, is connected to the communication network 7 computer network, and receives, stores, and analyzes operational information and positional information from working machines 1 which are present at various types of remote location, As shown in FIG. 4, the server 50 may, for example, comprise a communication control unit 51 which controls communication with the computer network, a calculation processing unit 52 for processing the information which is transmitted and received via the communication control unit 51, and a storage unit 53 which consists of a semiconductor memory or a hard disk device or the like.

The storage unit 53 comprises a program storage unit 53A which stores various types of computer program executed by the calculation processing unit 52, and a data base 53B for accumulating operational information and positional information received from the working machine 1, and other information.

By executing the various types of computer program described above, the calculation processing unit 52 is able to perform each of operational information reception processing 52A, operational information transfer processing 52B, lock setting processing by remote actuation 52C, lock release processing by remote actuation 52D, user password resetting processing 52E, and one-time password issuance processing 52F.

The operational information reception processing 52A is a function of receiving operational information and positional information from the working machine 1 and accumulating it in the data base 53B. And the operational information transfer processing 52B is a function of reading out operational information from the data base 53B and transferring this operational information via the computer network to the bank terminal 20. Here, it is not necessary for the operational information which is transferred to the bank terminal 20 to include all of the various types of state information described above; it only needs at least to include the operational time period, which is the material for making the decision as to whether there is a risk of an irrecoverable debt arising.

The lock setting processing by remote actuation 52C is a function for outputting a lock command to the working machine 1, for example based upon a command from the bank terminal 20. This lock command is received by the satellite communication terminal 130 of the working machine 1 via the satellite communication network, and, within the working machine 1, is transmitted from the communication controller 110 via the lock setting device 140 to the electronic controller 100. In response to this lock command, the electronic controller 100 locks the working machine, thus making it impossible for the operator to start the working machine 1, even if he attempts to do so.

The lock release processing by remote actuation 52D is a function of causing the locked state of the working machine 1 to be released, via the satellite communication network. Just as in the case of the lock command, an unlock command is received by the satellite communication terminal 130, and is transmitted from the communication controller 110 via the lock setting device 140 to the electronic controller 100.

The user password resetting processing 52E is a function of resetting the user password which is stored in the user password storage unit 144 to its initial value. A reset command is inputted to the lock setting device 140 via the satellite communication network or the like. According to this reset command, the lock setting device 140 resets the user password which is currently set to its initial value (for example, to predetermined alphabetic characters (A, B, C, D, and so on)). For example, if the user 3 or the operator should forget the user password, by the user 3 communicating with the vendor, it is possible for the user password to be reset by remote actuation. Then, by the user 3 or the operator inputting the initial value, it is possible for him to release the locked state in which the working machine 1 is set.

The one-time password issuance processing 52F is a function of, when a notification is received from the lock setting device 140 to the effect that the one-time password has been used, generating a new one-time password and transmitting it to the lock setting device 140. This new one-time password is registered in the one-time password storage unit 146 via the satellite communication network or the like.

Furthermore, as will be described hereinafter, in this one-time password issuance processing 52F, if a request for issuance of a one-time password (a generation request) has been inputted, a new password is generated.

Figure 5:
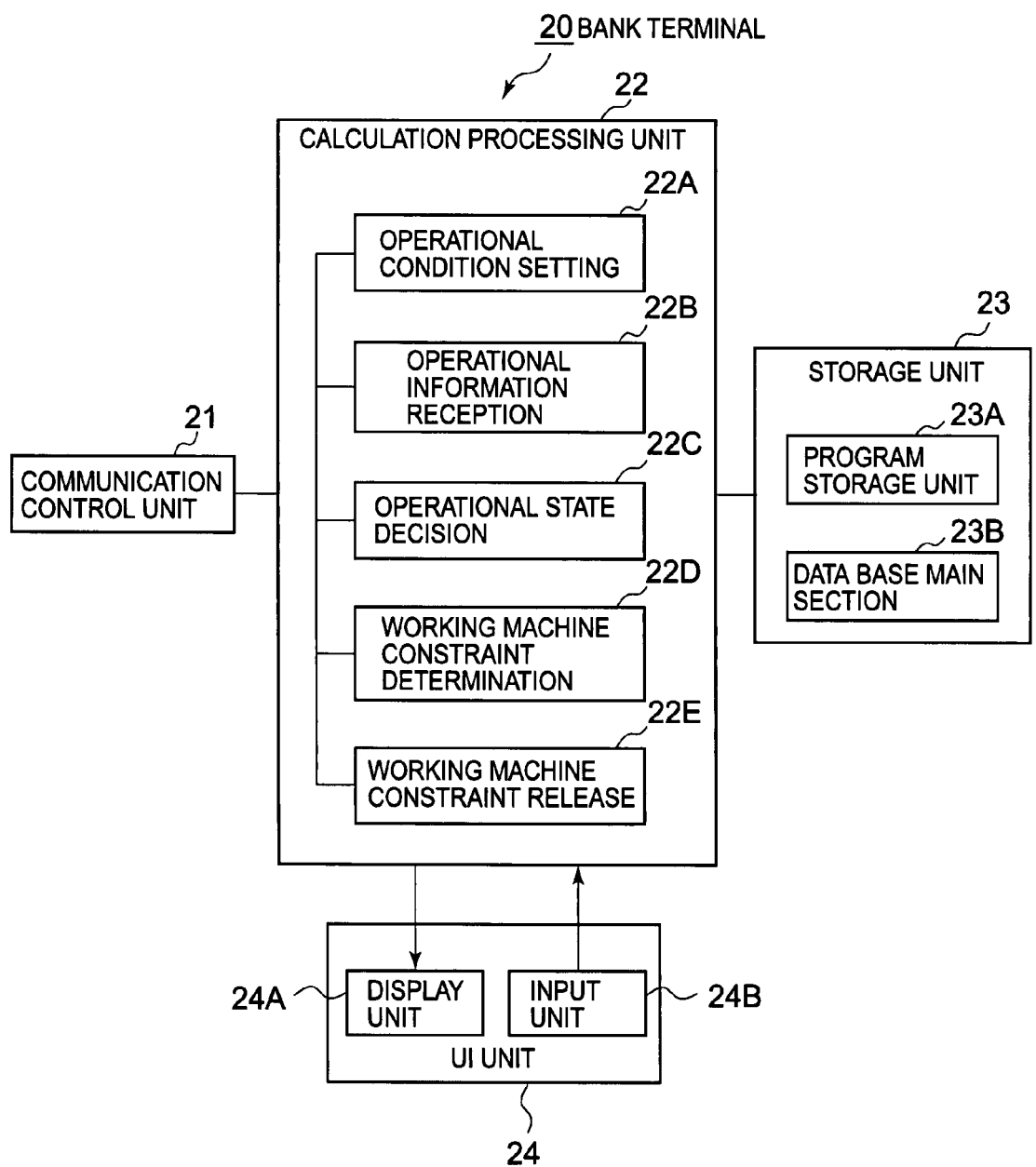
FIG. 5 is a block diagram showing the functional structure of a bank terminal.

FIG. 5 shows the functional structure of the bank terminal 20. This bank terminal 20, as already explained, may consist of a personal computer or the like. The bank terminal 20 is connected to the computer network, and can communicate with the server 50. And the bank terminal 20 may comprise a communication control unit 21, a calculation processing unit 22, a storage unit 23, and a UI unit 24.

The storage unit 23, for example, may consist of a semi conductor memory or a hard disk device or the like, and may be provided with a program storage unit 23A and a data base main section 23B. Application programs such as a web browser or an electronic mailer or the like are stored in the program storage unit 23A. And the operational information which has been received from the server 50 (above all, data about the operational time period, which straightforwardly indicates the amount of operation) may be stored in the data base main section 23B.

By executing a computer program, the calculation processing unit 22 is able to perform each of operational condition setting processing 22A, operational information reception processing 22B, operational state decision processing 22C, working machine constraint determination processing 22D, and working machine constraint release processing 22E.

Apart from this, the calculation processing unit 22 decides whether or not the working machine 1 is performing its activity within the specified area which has been designated in advance, and, if the working machine 1 has shifted outside the area, is also able to cause a lock command to be outputted or to perform processing to monitor the work area.

The operational condition setting processing 22A is processing for setting operational conditions. In order to set such operational conditions, it is possible to set, for example, the work area in which the working machine 1 can be active, the period in which inactivity of the working machine 1 is permitted, and so on.

The operational information reception processing 22B is a function of receiving operational information for the working machine 1 from the server 50, for example about once every day, and of storing this operational information which has been received in the storage unit 23.

The operational state decision processing 22C is a function of deciding whether or not the operational state of the working machine 1 satisfies some desired operational condition. In other words, in this operational state decision processing 22C, the operational state of the working machine 1 is expressed numerically and evaluated by feeding the operational information of the working machine 1 which is stored in the storage unit 23 into a predetermined calculation equation. And, in this operational state decision processing 22C, this evaluation N which has been calculated and a threshold value Nth for evaluation which has been set in advance are compared together, and, if N<Nth, then it is decided that the operational state of the working machine 1 does not satisfy the desired operational condition (which means that there is a possibility that the business state of the user 3 is perilous).

The working machine constraint processing determination processing 22D is a function of determining that the working machine 1 is in the locked state due to remote operation using the manager password. And the working machine constraint release processing 22E is a function of releasing the locked state into which the working machine 1 has been set, by remote actuation using the manager password.

FIG. 6 shows an example of a working device management table T1 which is managed by the server 50. This management table T1, for example, may be constructed by putting user IDs for identifying each of the users, the user names, the machine IDs for identifying each of the working machines 1, the titles of the working machines, the one-time passwords which are allocated to the working machines, and whether or not each of the working machines is in the locked state, into mutual correspondence.

Figure 7:
FIG. 7 is an explanatory figure showing a working device management table which is managed on the bank side.

FIG. 7 shows an example of a working device management table T2 which is managed on the side of the bank 2. This management table T2, for example, may be constructed by putting the user IDs, the user names, the machine IDs, the titles of the working machines, the utilization rates (or the evaluation values N) of the working machines, the balance remaining of the money loaned as mortgages upon the working machines, whether or not the working machines are subject to mortgages, and whether or not each of the working machines is in the locked state, into mutual correspondence.

Figure 8:
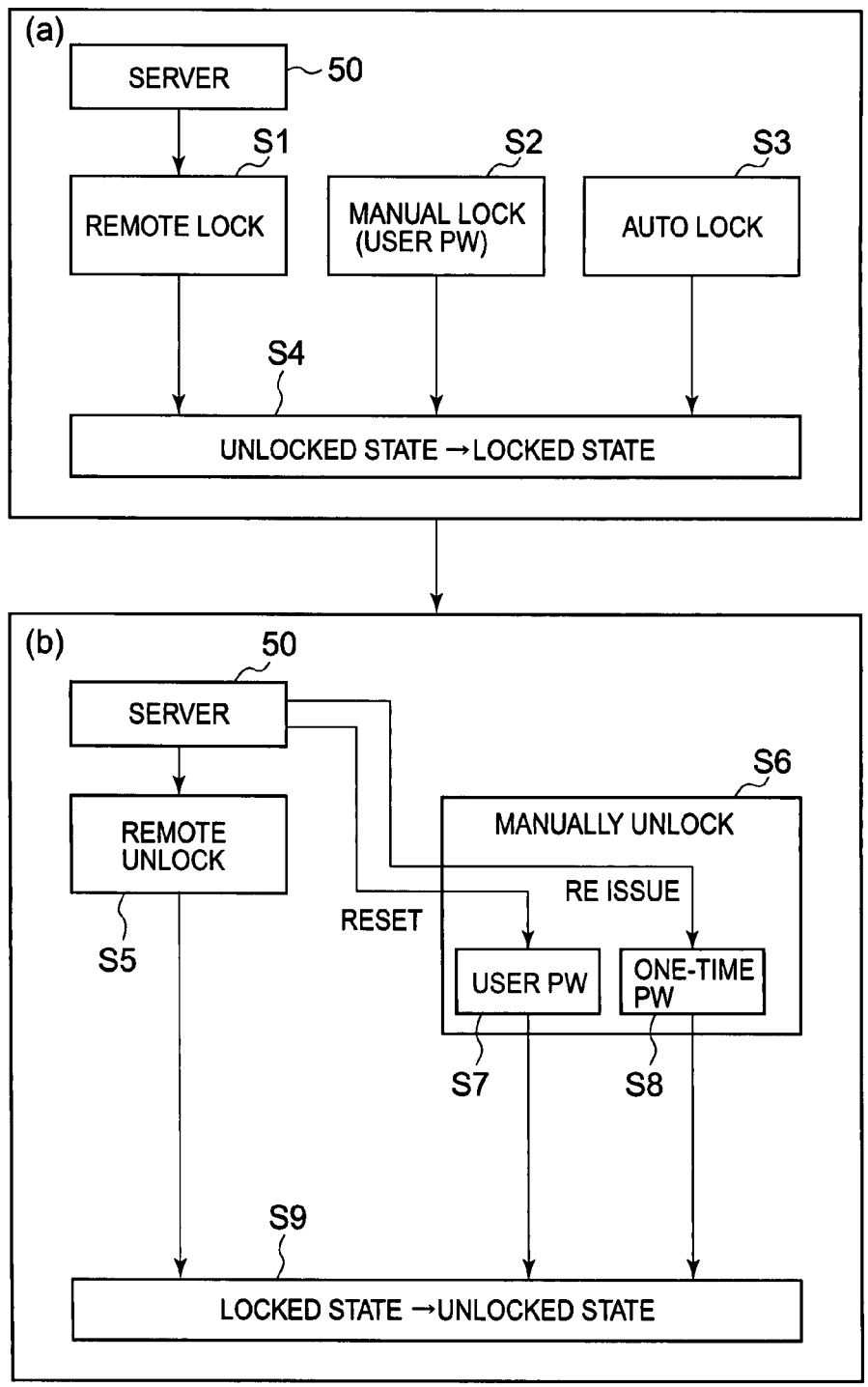
FIG. 8 is an explanatory figure showing lock methods and unlock methods of a plurality of types.

Next, the operation of this system will be explained based upon FIGS. 8 through 15. First, FIG. 8 is an explanatory figure showing a summary of lock control by this system. FIG. 8(*a*) is a schematic figure showing the method for setting the working machine 1 to the locked state. With this system, as described above, it is possible to apply locking by remote actuation (a block S1) based upon a command from the server 50. Furthermore, by inputting the user password from the input unit 152, it is possible to apply locking by manual actuation (a block S2). Moreover, with this system, an auto lock mode is also provided: it is also arranged for it to be possible to apply locking automatically, if the operator has stopped the engine 170 (a block S3). In this manner, it is arranged for it to be possible to set the working machine 1 to its locked state in three types of modes. Due to this, the state of the working machine 1 is changed from the unlocked state to the locked state (a block S4). The details of each of these modes will be further described hereinafter.

Next, FIG. 8(*b*) is a schematic figure showing the method for releasing the locking of the working machine 1. As described above, it is possible to release the locking by remote actuation, based upon a command from the server 50 (a block S5). Furthermore, the operator or the lake can also release the locked state which has been set to the working machine 1 by manual actuation (a block S6). This lock release by manual actuation furthermore includes a method (a block S7) which uses the user password, and a method (a block S8) which uses the one-time password.

In this manner, it is possible to release the locked state of the working machine 1 in three types of modes; and, due to this, the working machine 1 changes from the locked state to the unlocked state (a block S9). It should be understood that it is possible to set different priorities between these modes. As already explained, for example, the structure may be such that, if locking has been set by remote actuation (the block S1), then it is not possible to release the locking by manual actuation with the user password (the block S7).

Figure 9:
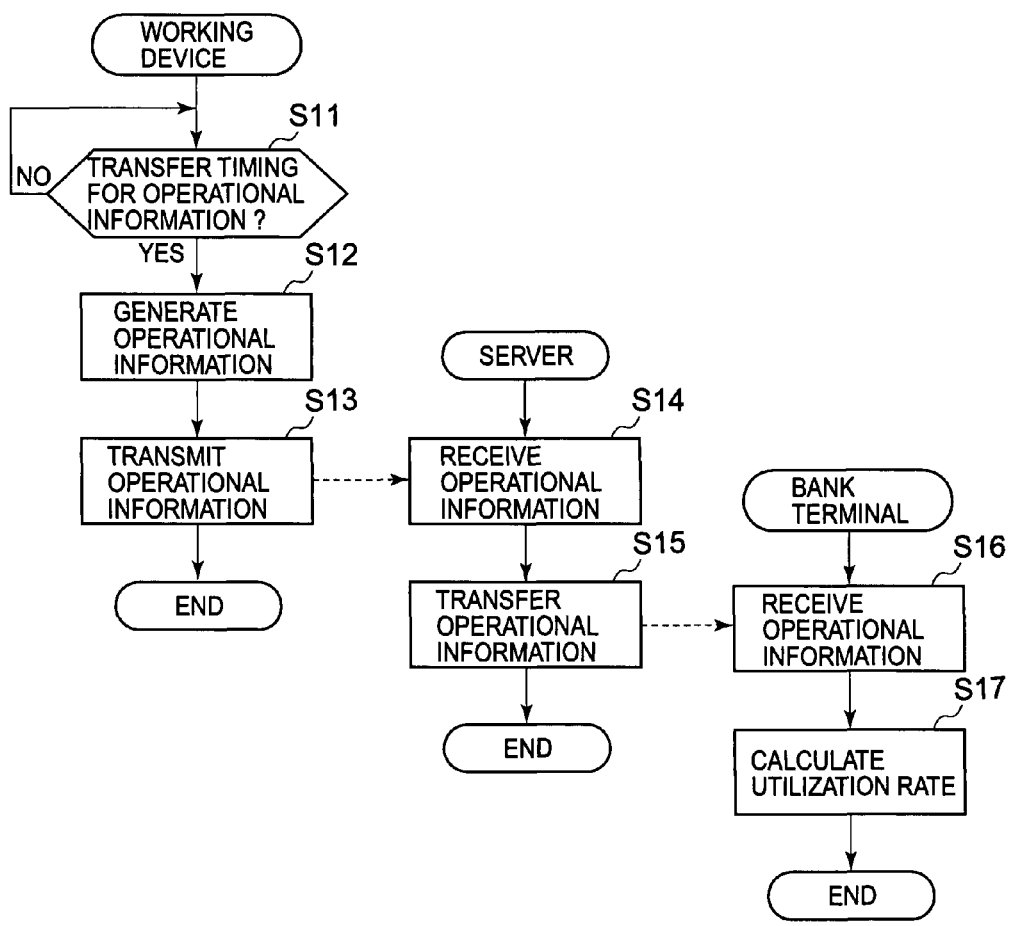
FIG. 9 is a flow chart showing a unified management method for operational information.

Before describing the details of each type of locking control, an outline of the method for managing the utilization rates of the working machines 1 on the side of the bank terminal 20 in a unified manner will be explained. FIG. 9 is a flow chart showing the processing for managing the utilization rates of the working machines 1 in a unified manner.

The working machine 1 monitors whether or not the transfer timing (report timing) for the operational information has arrived (a step S11), and if it has decided that the transfer timing has arrived, (S11: YES), then it generates the operational information (a step S12), and transmits it to the server 50 (a step S13). For example, it may transmit the operational information to the server 50 at a frequency of around once per day, in the time period band in which work in the workplace ends.

When the server 50 receives the operational information from the working machine 1 (a step S14), it transfers it to the bank terminal 20 (a step S15). Since this operational information may be left in the server 50, the server is able to take advantage of the operational information and to use it in the best possible manner for maintenance servicing and the like.

When the bank terminal 20 receives the operational information from the server 50 (a step S16), it calculates the utilization rate based thereupon (a step S17). By doing this, the bank terminal 20 is able to decide whether the risk of an irrecoverable debt is present, based upon the operational state of the working machine 1. And, based upon such a risk of an irrecoverable debt having being decided upon, it is possible to cause the working machine 1 to be locked by remote actuation.

Figure 10:
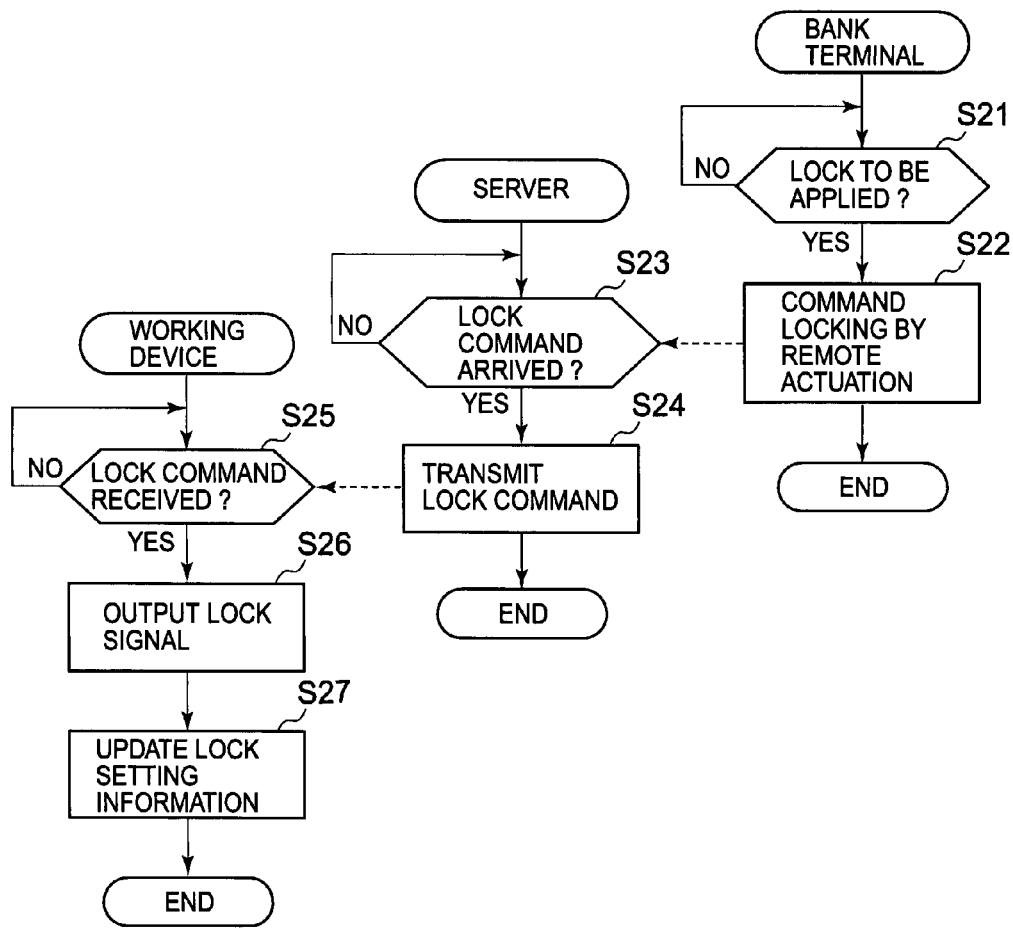
FIG. 10 is a flow chart showing lock processing by remote actuation.

FIG. 10 is a flow chart showing the processing for setting the working machine 1 into the locked state by remote actuation. The bank terminal 20 considers the risk of irrecoverable debt and so on, and decides whether or not to perform remote locking (a step S21). If it has determined upon locking the working machine 1 (S21: YES), then the bank terminal 20 specifies the working machine 1 to the server 50 and commands it to be locked (a step S22).

When the server 50 receives this lock command from the bank terminal 20 (S23: YES), it transmits the lock command to the working machine 1 (a step S24). The manager password which is established in correspondence to this working machine 1 is included in this lock command.

When the working machine 1 receives the lock command from the server 50 via the satellite communication network (S25: YES), it outputs a lock signal (a step S26), and updates the lock setting information which is stored in the lock setting storage unit 141 (a step S27). That is to say, it stores in the lock setting information, the fact that this machine has been locked by remote actuation.

Figure 11:
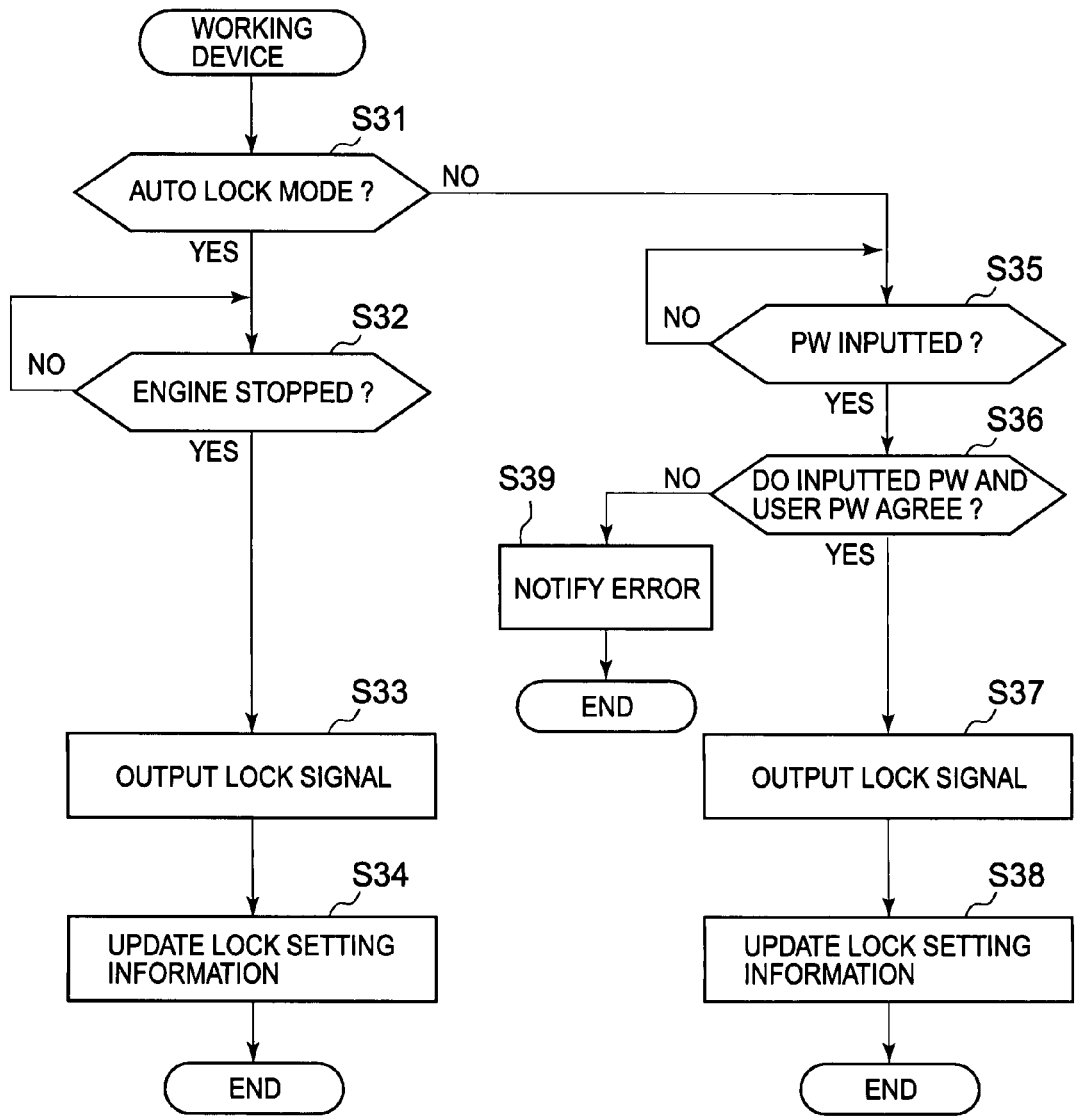
FIG. 11 is a flow chart showing lock processing by local actuation.

Next, FIG. 11 is a flow chart showing local lock control which is executed on the side of the working machine 1.

The working machine 1 decides whether or not the auto lock mode is set (a step S31). The operator or the like is able to select the auto lock mode via the UI unit 150. If the auto lock mode is set (S31: YES), then the working machine 1 monitors whether or not the engine 170 has stopped (a step S32). If the engine 170 has stopped (S32: YES), then the working machine 1 outputs a lock signal (a step S33). And the working machine 1 updates the lock setting information (a step S34). That is to say, the fact that locking has been performed by the auto lock mode is stored in the lock setting information.

However, if the auto lock mode is not selected in advance (S31: NO), then the working machine 1 decides whether or not a password has been manually inputted from the input unit 152 (a step S35). When some character string is inputted by the operator or the like (S35: YES), the working machine 1 compares the password which has been inputted and the user password which is registered in advance in the working machine 1 (a step S36).

If the password which has been manually inputted and the user password which is registered agree with one another (S36: YES), then the working machine 1 outputs a lock signal, and sets the lock state (a step S37). And the working machine 1 updates the lock setting information (a step S38). In this lock setting information, the fact that locking has been applied by manual actuation using the user password is stored. But, if the password which has been manually inputted and the user password which is registered do not agree with one another (S36: NO), then the working machine 1 does not apply locking, but an error message is displayed upon the display unit 151 (a step S39).

It should be understood that although, in FIG. 11, if the auto lock mode is not set, it is shown that the system monitors whether or not the user password has been inputted, it would also be possible to perform such monitoring for the user password, even if the auto lock mode is set.

Figure 12:
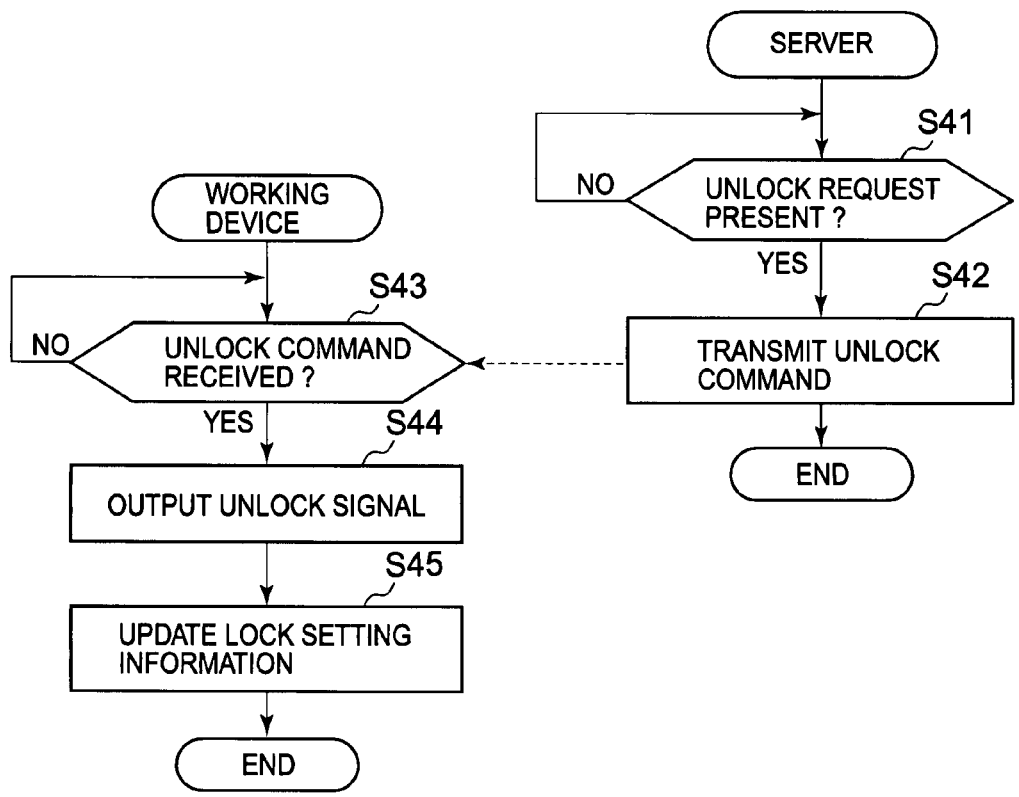
FIG. 12 is a flow chart showing unlock processing by remote actuation.

FIG. 12 is a flow chart showing unlock processing by remote actuation from the server 50. For example, the server 50 may decide whether or not to perform remote unlocking (a step S41), according to a requirement from the bank terminal 20, or according to a communication from a maintenance person who has been dispatched to the workplace.

If it is determined to release the locked state by remote actuation (S41: YES), then the server 50 transmits an unlock command to the working machine 1 (a step S42). At least the manager password is included in this unlock command.

When the working machine 1 receives the unlock command from the server 50 (S43: YES), it outputs an unlock signal (a step S44), and releases the locked state. Furthermore, the working machine 1 updates the lock setting information (a step S45). The fact that the lock has been released by remote actuation may be stored in this lock setting information.

Figure 13:
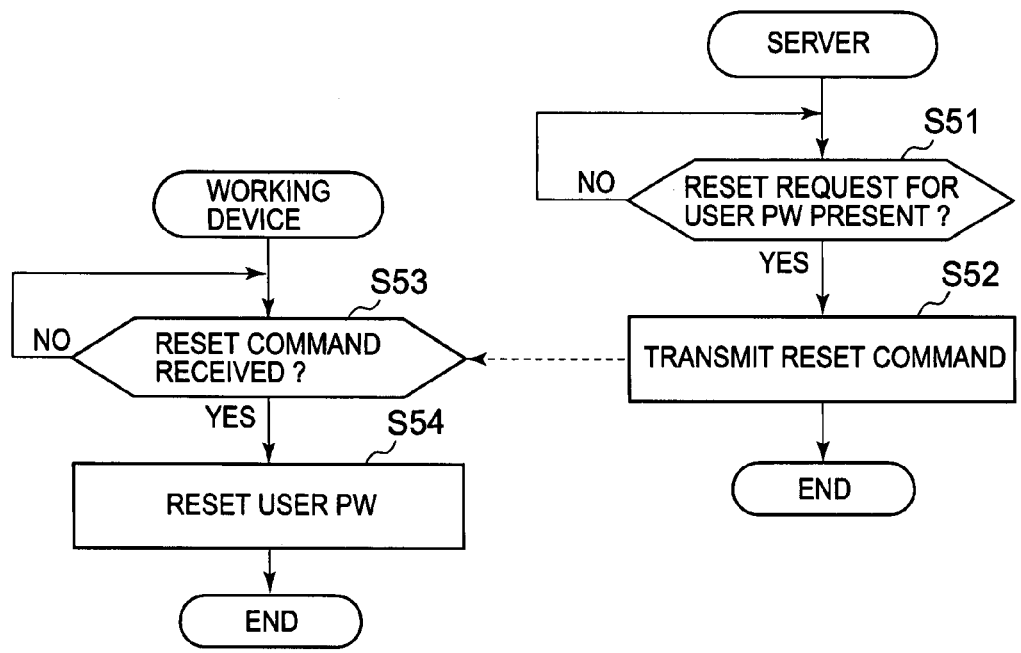
FIG. 13 is a flow chart showing resetting processing for a user password.

FIG. 13 is a flow chart showing user password resetting processing by remote actuation. Based, for example, upon communication from the user 3 who has forgotten his user password, or upon communication from maintenance personnel, the server 50 is able to decide whether or not to reset the user password (a step S51). If it is determined to perform this reset operation (S51: YES), then the server 50 transmits a reset command to the working machine 1 (a step S52). The manager password may, for example, be included in this reset command.

Upon receipt of the reset command from the server 50 (S53: YES), the working machine 1 resets the user password which is registered in the user password storage unit 144, and returns the value thereof to its initial value (a step S45). Accordingly, the user 3 or the operator is able to release the locked state to which the working machine 1 is set by inputting, for example, the predetermined number of alphabetic characters (A, B, C, D, and so on) from the input unit 152. Subsequently, the user 3 or the operator is able to register a new user password in the user password storage unit 144.

Figure 14:
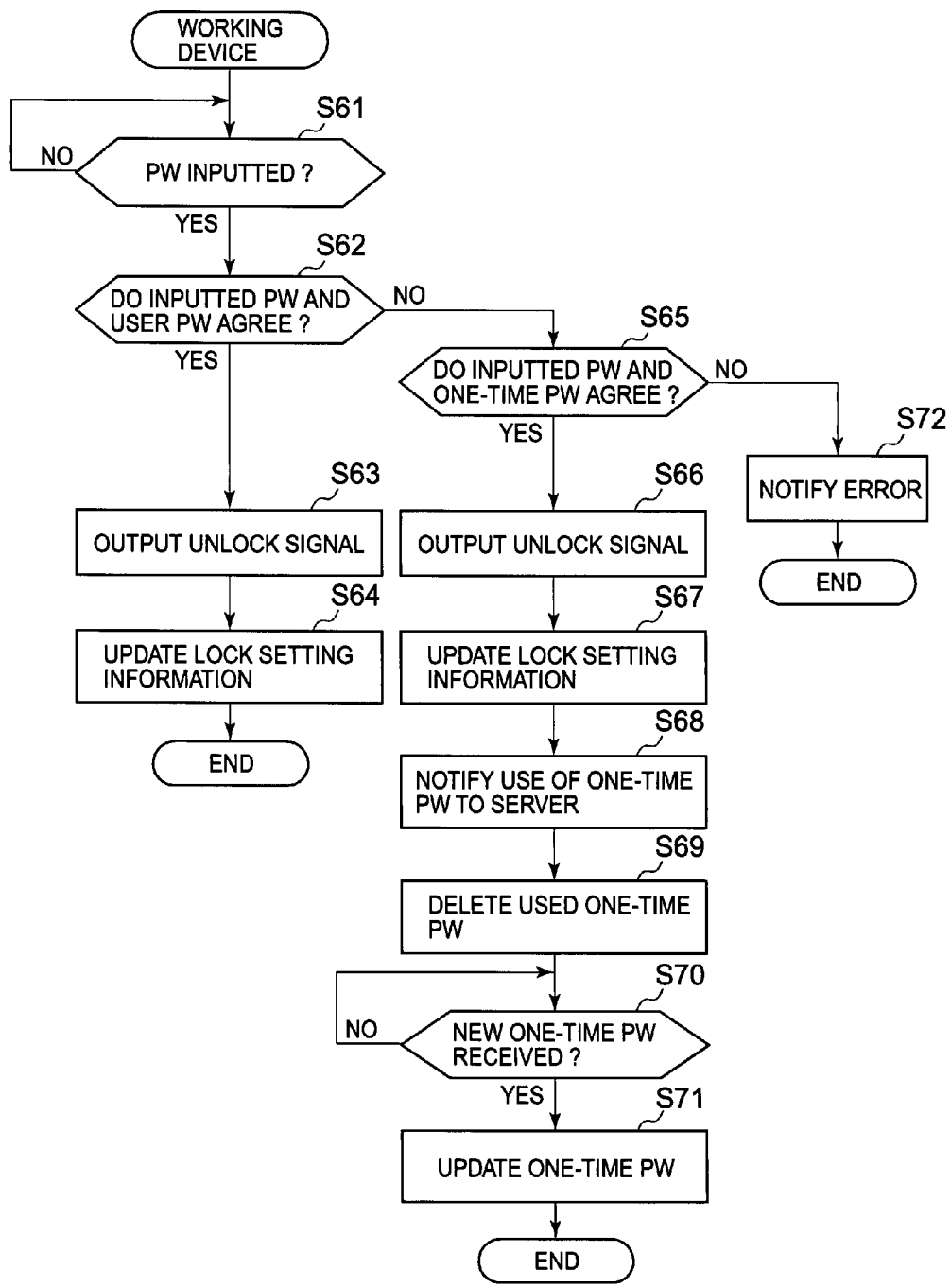
FIG. 14 is a flow chart showing unlock processing by local actuation.

Next, FIG. 14 is a flow chart showing unlock processing by local actuation. The working machine 1 monitors whether or not some character string (a password) has been inputted from the input unit 152 (a step S61). If a password has been inputted (S61: YES), then the working machine 1 decides whether or not this password which has been inputted and the user password which is registered in the user password storage unit 144 agree with one another (a step S62).

If the password which has been inputted and the user password agree with one another (S62: YES), then the working machine 1 outputs an unlock signal, and releases the lock state (a step S63). Furthermore, the working machine 1 may store the fact that the locking has been released with the user password in the lock setting information (a step S64). Although this is the same as in portions of the description above and portions to be described subsequently, it should be understood that the lock setting information does not necessarily always need to be updated. It will be sufficient if the lock setting information is updated according to requirements.

But, if the password which has been inputted from the input unit 152 and the user password which is registered do not agree with one another (S62: NO), then the working machine 1 compares together this password which has been inputted and the one-time password which is stored in the one-time password storage unit 146 (a step S65).

If the password which has been inputted and the one-time password agree with one another (S65: YES), then the working machine 1 outputs an unlock signal (a step S66), and releases the locked state. Furthermore, the working machine 1 may store the fact that the locking has been released with the one-time password in the lock setting information (a step S67).

The one-time password which has been used once becomes ineffective, and it becomes impossible to use it again. Thus, the working machine 1 notifies the server 50 via the satellite communication network of the fact that the one-time password has been used (a step S68). And, after having deleted the one-time password which has been used (a step S69), the working machine 1 waits until it receives a new one-time password from the server 50 (a step S70). When a new one-time password is received from the server 50 (S70: YES), the working machine 1 stores this new one-time password in the one-time password storage unit 146 (a step S71).

It should be understood that, as described hereinafter, the working machine 1 may also generate a new one-time password by itself, and may store it in the one-time password storage unit 146. Although the details will be further described hereinafter, the server 50 and the working machine 1 are able to generate the one-time password individually by inputting the same fundamental information (device number and time instant information) to the same generating conditional expression. Accordingly, as a result, the one-time passwords which are generated individually by the server 50 and the working machine 1 will have the same value.

It should be understood that, if the password which has been inputted from the input unit 152 by manual actuation does not agree with either the user password or the one-time password (S65: NO), then the locked state is not released, but instead an error message is displayed upon the display unit 151 (a step S72).

Figure 15:
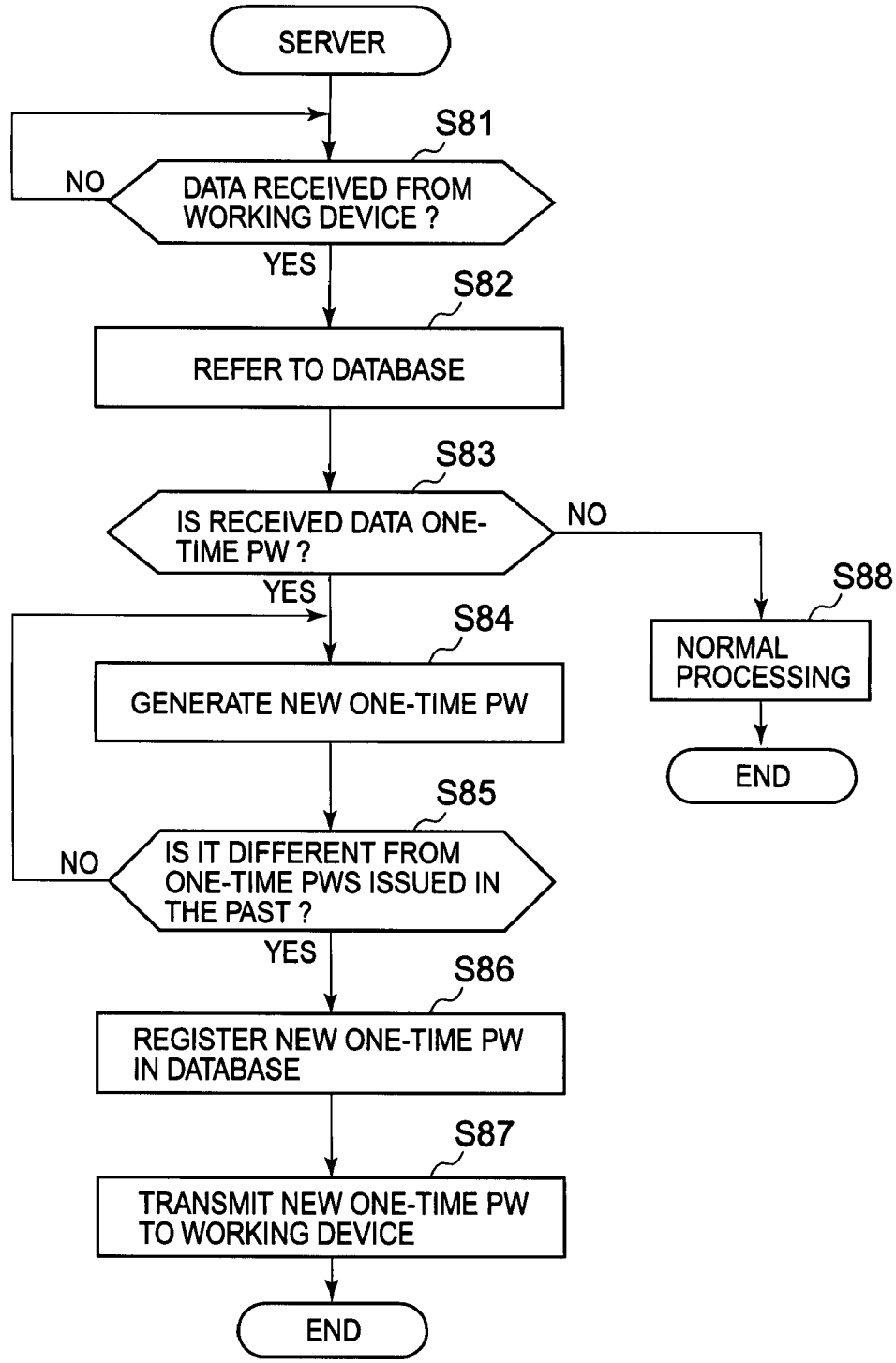
FIG. 15 is a flow chart showing issuance processing for a one-time password.

FIG. 15 is a flow chart showing one-time password issuance processing. The server 50 monitors whether or not any data has been received from the working machine 1 (a step S81). If some data has been received from the working machine 1 (S81: YES), then the server 50 refers to the data base 53B (a step S82), and decides whether or not a one-time password is included in the data which has been received, or whether or not the received data is itself a one-time password (a step S83). If the data which has been received from the working machine 1 is a one-time password (S83: YES), then this means that the one-time password for this working machine 1 has been used.

Thus, the server 50 generates a new one-time password (a step S84), and decides whether or not this one-time password which has been generated is different from a one-time password which has already been issued (a step S85). For example, it may decide whether or not this is the same as a one-time password which has already been issued to a working machine of the same type as this working machine 1, by referring to the working device management table T1 shown in FIG. 6. The contents of the management table T1 are included in the data base 53B.

If no one-time password which has been issued is duplicated (S85: YES), then the server 50 registers this new one-time password in the data base 53B (a step S86), and transmits this new one-time password via the satellite communication network to the working machine 1 (a step S87). As already described, when the working machine 1 receives this one-time password, it stores it in the one-time password storage unit 146.

Here, it is possible to encode the one-time password when transmitting it from the server 50 to the working machine 1. When the working machine 1 receives this one-time password which has been encoded, it decodes it and stores it in the one-time password storage unit 146.

If the one-time password which has been generated and some other one-time password agree with one another (S85: NO), then the server 50 again generates a different one time password (a step S84), and repeats the test described above (a step S85).

It should be understood that, if the data which has been received from the working machine 1 is not a request for re-issue of a one-time password (S83: NO), then the server 50 performs normal processing according to the details of this received data (a step S88). As such normal processing, for example, there may be cited reception transfer processing of the above described operational information.

As described in detail above, with this embodiment, it is possible to perform lock control of the working machine 1 by remote actuation via the satellite communication network, and moreover it is also possible to perform lock control of the working machine 1 by local actuation using the UI unit 150. Due to this, it is possible to perform lock control by an appropriate method, according to the state of the working machine and so on, so that the convenience of use is enhanced.

In this embodiment, when releasing locking by local actuation, it is possible to utilize both the user password and also the one-time password. Accordingly, even if for example the user 3 has locked the working machine 1 intentionally in order to escape from distraint or the like, still it is possible for the locking of the working machine 1 to be released by a maintenance person inputting the one-time password, so that the ease of the task of forcible retrieval or the like is improved.

If it is not possible to release the locked state of the working machine 1 by remote actuation, then the one-time password is communicated to the user or to the maintenance person via a communication means such as telephone or the like. The locked state may be released by the user or the maintenance person, who knows the one-time password, inputting the one-time password to the working machine 1. Since the one-time password can only be used once, and cannot be used for a second time, accordingly, even if the user knows it, it is still possible to prevent him from using it improperly thereafter, or the like. The one-time password is only capable of being used once, and cannot be used for a second time. Accordingly, even if the one-time password becomes known to the user or to a third party, he cannot release the locked state by using this one-time password once it has already been used, so that improper usage is prevented.

In this embodiment, it is possible to reset the user password by remote actuation. Accordingly, if the user 3 has forgotten his user password, it is possible to set a new user password for the user 3 by resetting the user password by remote actuation. It is not necessary for maintenance personnel to rush to the workplace and to input the one-time password into the working machine 1, but rather it is possible to restore the working machine 1 to a usable state by remote actuation; and accordingly the efficiency of maintenance work is enhanced.

Embodiment 2

Next, a second embodiment will be explained based upon FIG. 16. In this embodiment, in the auto lock mode, the lock operation time period is delayed.

Figure 16:
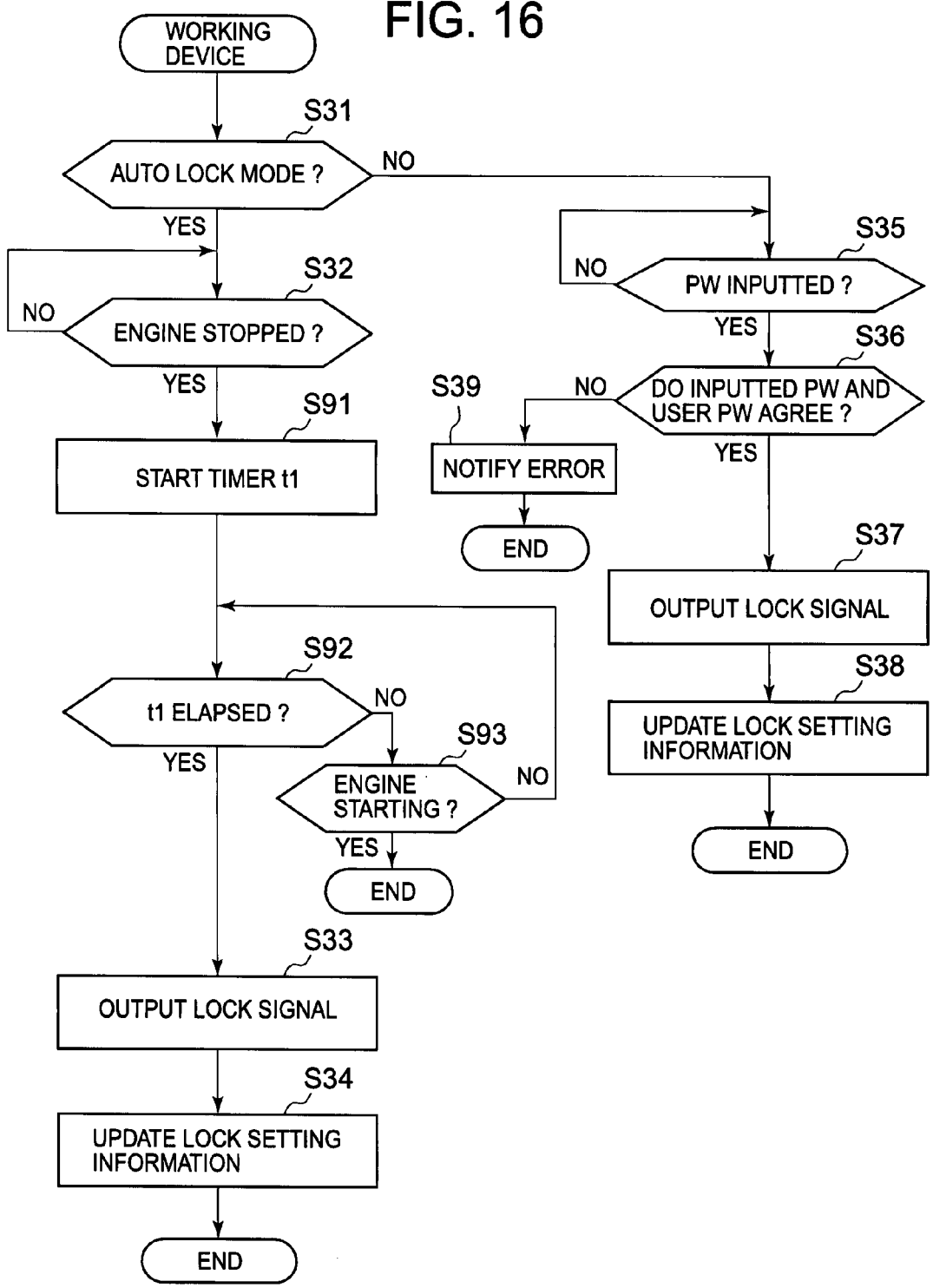
FIG. 16 is a flow chart showing lock processing by local actuation, according to a second embodiment.

FIG. 16 is a flow chart showing lock processing by manual actuation, according to this embodiment, and includes the steps S31 through S39 described with reference to FIG. 11. In addition thereto, in this embodiment, if the engine 170 has stopped in the auto lock mode (S32: YES), then a timer is started for measuring a predetermined delay time period t1 (a step S91).

When the delay time period t1 elapses (S92: YES), a lock signal is outputted (a step S33), and the working machine 1 is locked. On the other hand, if the engine 170 is restarted (S93: YES) before the delay time period t1 elapses (S92: NO), then auto locking is not performed, but instead this processing is terminated normally.

That is to say, in this embodiment, in the auto lock mode, even if the engine 170 has temporarily stopped, auto locking is not performed until the predetermined delay time period t1 elapses. If the engine 170 is restarted within the predetermined delay time period t1, auto locking is not performed, but instead processing terminates. Due to this, if for example engine stalling has occurred, or the operation has left the working machine 1 for only a short time period, it is possible to prevent auto locking being performed directly, so that the convenience of use is enhanced.

Embodiment 3

This embodiment will be explained based upon FIG. 17. In this embodiment it is arranged, if the working machine 1 is locked with the manager password, for it not to be possible to perform unlocking operation with the user password.

Figure 17:
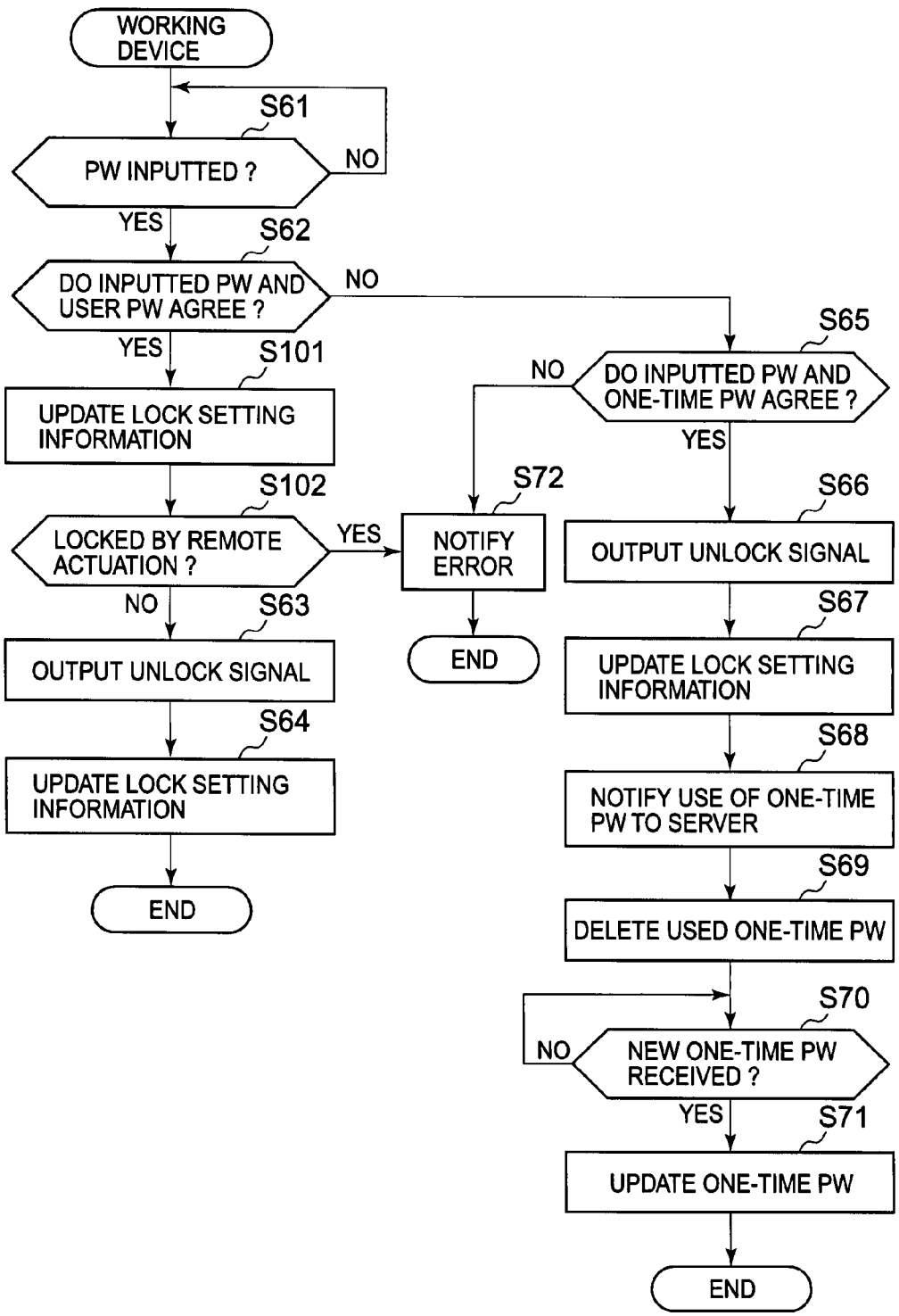
FIG. 17 is a flow chart showing unlock processing by local actuation, according to a third embodiment.

FIG. 17 is a flow chart showing unlock processing by local actuation. This flow chart includes the steps S61 through S72 in common with the embodiment shown in FIG. 14. Explanation of common steps is curtailed, and the following explanation will focus upon the steps which are characteristic of this embodiment.

If the user password which has been inputted via the input unit 152 and the user password which is stored in the user password storage unit 144 agree with one another (S62: YES), then the working machine 1 refers to the lock setting information (a step S101). And, based upon the lock setting information, the working machine 1 decides whether or not locking is already set by remote actuation (a step S102). If locking is set by remote actuation (S102: YES), then the working machine 1 prevents release by the user password, and notifies an error (a step S72).

If locking is not set by remote actuation (S102: NO), then the working machine 1 causes an unlock signal to be outputted and thus releases the locked state (a step S63), and updates the lock setting information (a step S64).

By according the manager password superior precedence over the user password in this manner, if the working machine 1 is locked with the manager password, the user 3 is not able to release the lock using the user password. Accordingly, the bank becomes able to exercise distraint upon the working machine 1 more reliably, so that the convenience of use is enhanced. Furthermore, it is also possible to accord the one-time password a higher precedence than the user password and the manager password. In this case, the order of priority of the passwords in descending order becomes: the one-time password (highest); the manager password (second); and the user password (third). By assigning the most significant position in this manner to the one-time password, among the plurality of types of password, the convenience of use is further enhanced, since it is possible to release the locked state of the working machine 1 with the one-time password, whatever state it may be in.

Embodiment 4

A fourth embodiment will now be explained based upon FIG. 18. In this embodiment it is arranged, when performing locking by remote actuation with the manager password, to perform the locking after having decided whether or not it is possible to lock the working machine.

Figure 18:
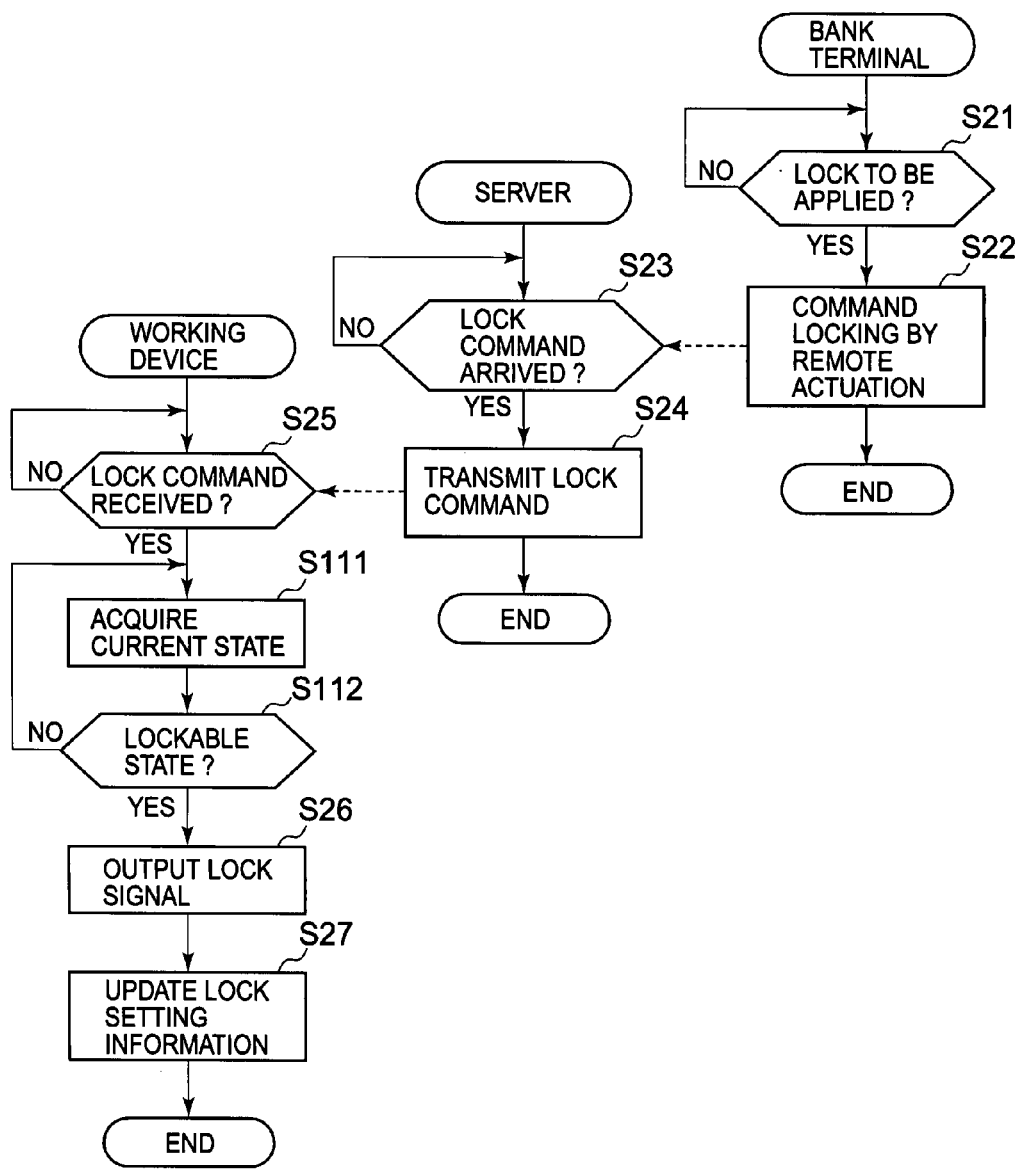
FIG. 18 is a flow chart showing lock processing by remote actuation, according to a fourth embodiment.

FIG. 18 is a flow chart showing lock processing for locking the working machine 1 by remote actuation. This flow chart includes the steps S21 through S27 in common with the embodiment shown in FIG. 10. Explanation of these common steps is curtailed, and the following explanation will focus upon the steps which are characteristic of this embodiment.

When the working machine 1 receives a lock command from the server 50 (a step S25), it acquires the current state of the working machine 1 (a step S111) based upon the signals from the sensor group shown in FIG. 2 and so on. Based upon this current state, the working machine 1 then decides whether or not the working machine 1 is currently put into a state in which it can be locked (a step S112). For example, it is not acceptable suddenly to apply locking in a state such as one in which the working machine 1 is moving.

Thus, the working machine 1 delays the lock setting until it comes to be in a state in which locking is possible (S112: YES). For example, it is possible to decide that the working machine 1 is in a state in which it can be locked, if its engine 170 has been stopped for greater than or equal to a fixed time period. If a state in which the working machine 1 can be locked has been detected (S112: YES), then the working machine 1 causes a lock signal to be outputted (a step S26), and updates the lock setting information (a step S27).

Embodiment 5

A fifth embodiment will now be explained based upon FIGS. 19 through 22. In this embodiment, it is arranged for both the working machine 1 and the server 50 each to be able to generate the one-time password.

Figure 19:
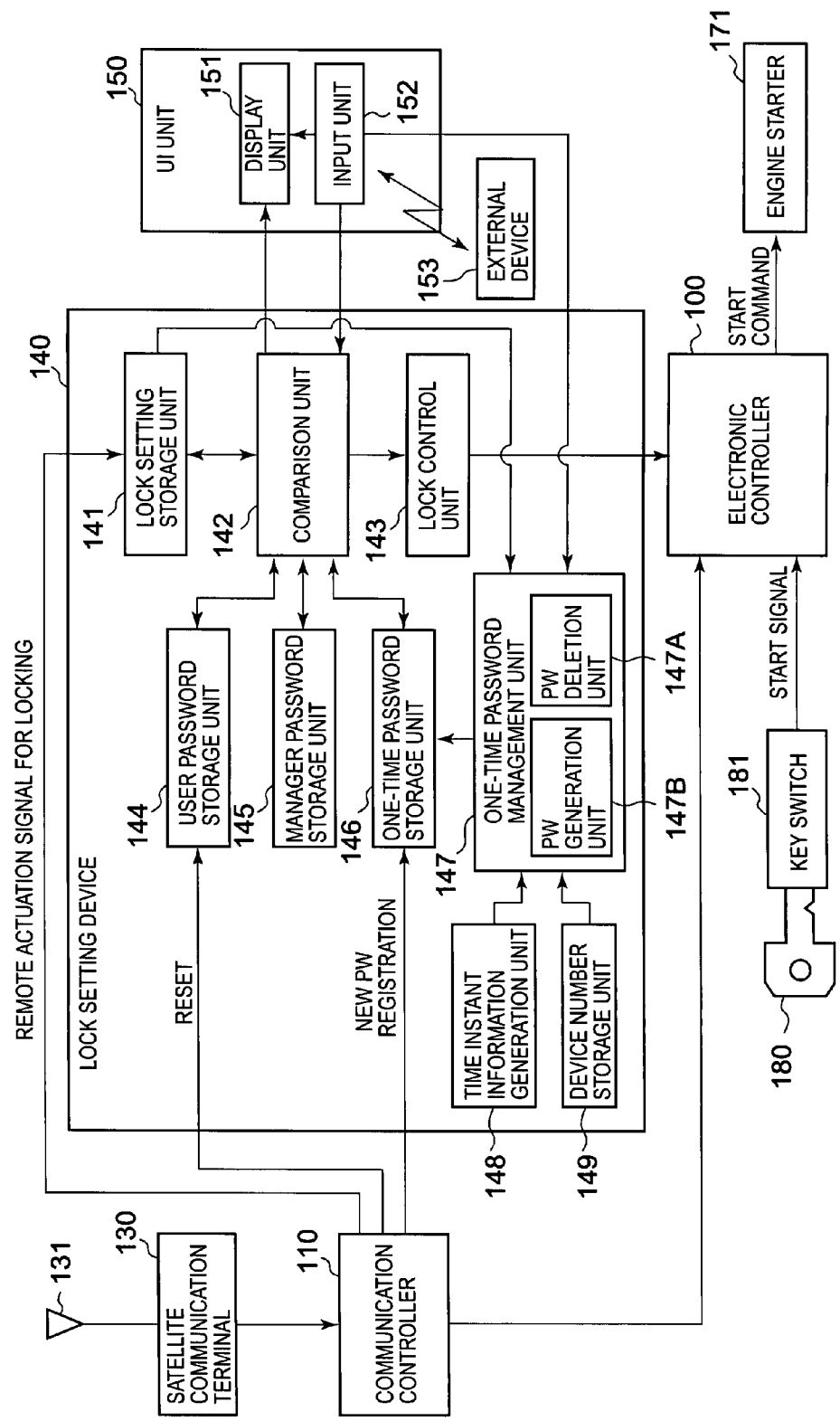
FIG. 19 is a block diagram showing the functional structure of a lock setting device according to a fifth embodiment.

FIG. 19 is an explanatory figure showing the functional structure of the lock setting device 140 which is provided to the working machine 1 according to this embodiment. Explanation of structures which duplicate those of the embodiments described above is curtailed, and the following explanation will focus upon the structures which are characteristic of this embodiment.

A one-time password management unit 147 is provided to the lock setting device 140 of this embodiment, for managing the one-time password. This one-time password management unit 147 may comprise a one-time password deletion unit (a "PW deletion unit" in the figure) 147A, and a one-time password generation unit (a "PW generation unit") 147B.

In predetermined circumstances, the one-time password deletion unit 147A actively or passively deletes the one-time password which has been stored in the one-time password storage unit 146. These predetermined circumstances are when the one-time password which is stored in the one-time password storage unit 146 has been used, and/or when a request for generation of a one-time password (an issuance request) has been inputted from the input unit 152.

Here, by the one-time password being deleted passively, is meant a case such as one in which the one-time password stored in the one-time password storage unit 146 which has been used is overwritten with a new one-time password.

The one-time password generation unit 147B, in predetermined circumstances, generates a new one-time password, and stores it in the one-time password storage unit 146. In the same manner as above, these predetermined circumstances are when the one-time password which is stored in the one-time password storage unit 146 has been used, and/or when a request for generation of a one-time password (an issuance request) has been inputted from the input unit 152.

The one-time password generation unit 147B generates a new one-time password according to a predetermined generating conditional expression, based upon the present time instant, as acquired from a time instant information generation unit 148, and the device number, as acquired from a device number storage unit 149. Here, the time instant information may specify the present time instant at a level according to requirements, for example like year/month/day (2005/12/1 or the like), year/month/day and hour (2005/12/1-13 or the like), year/month/day and hour:minute (2005/12/1-13:30 or the like), or year/month/day and hour:minute:second (2005/12/1-13:30:20 or the like). Here, for the convenience of explanation, the description will use year/month/day.

The device number is identification information for specifying the working machine 1 uniquely, and it is issued and managed by the vendor of the working machine 1. It never happens that the same device number is issued by the same vendor in duplicate to different working machines.

The one-time password generation unit 147B, for example, may utilize, as the one-time password, a predetermined number of the most significant digits of the value which is obtained by multiplying together the present time instant, the device number, and a predetermined coefficient.

That is to say, the one-time password generation unit 147B may generate a new one-time password using a generating conditional expression like "new one-time password=most significant n digits of (present time instant×device number× predetermined coefficient)".

For example, if the time instant when generation of the new one-time password is requested is "2006/3/3", the device number is "13548", and the predetermined coefficient is "0.05", then the result of multiplying these together is 13548× 20060303×0.05=13588849252.2. And the most significant four digits (1358) or the most significant 5 digits (13588) of this product value are used as the one-time password.

The time instant information described in the AD year-month-day format changes every day, and the device number is a value which is intrinsic to each working machine 1. Accordingly, although there may be a discrepancy due to the number of digits employed, if the one-time password is generated in this manner, the possibility of duplicating the one-time password is low. It should be understood that the above use of the most significant four digits or the most significant five digits is not limitative; it would also be acceptable to employ the most significant six digits. The greater the number of digits becomes, the more is the security level enhanced, but the more the labor of input increases. However, even if the number of digits in the one-time password is large, it is still possible to input the one-time password to the lock setting device 140 in an accurate manner while eliminating input mistakes due to human factors if, as described above, an external device such as an ID card or a portable telephone or the like is used.

Figure 20:
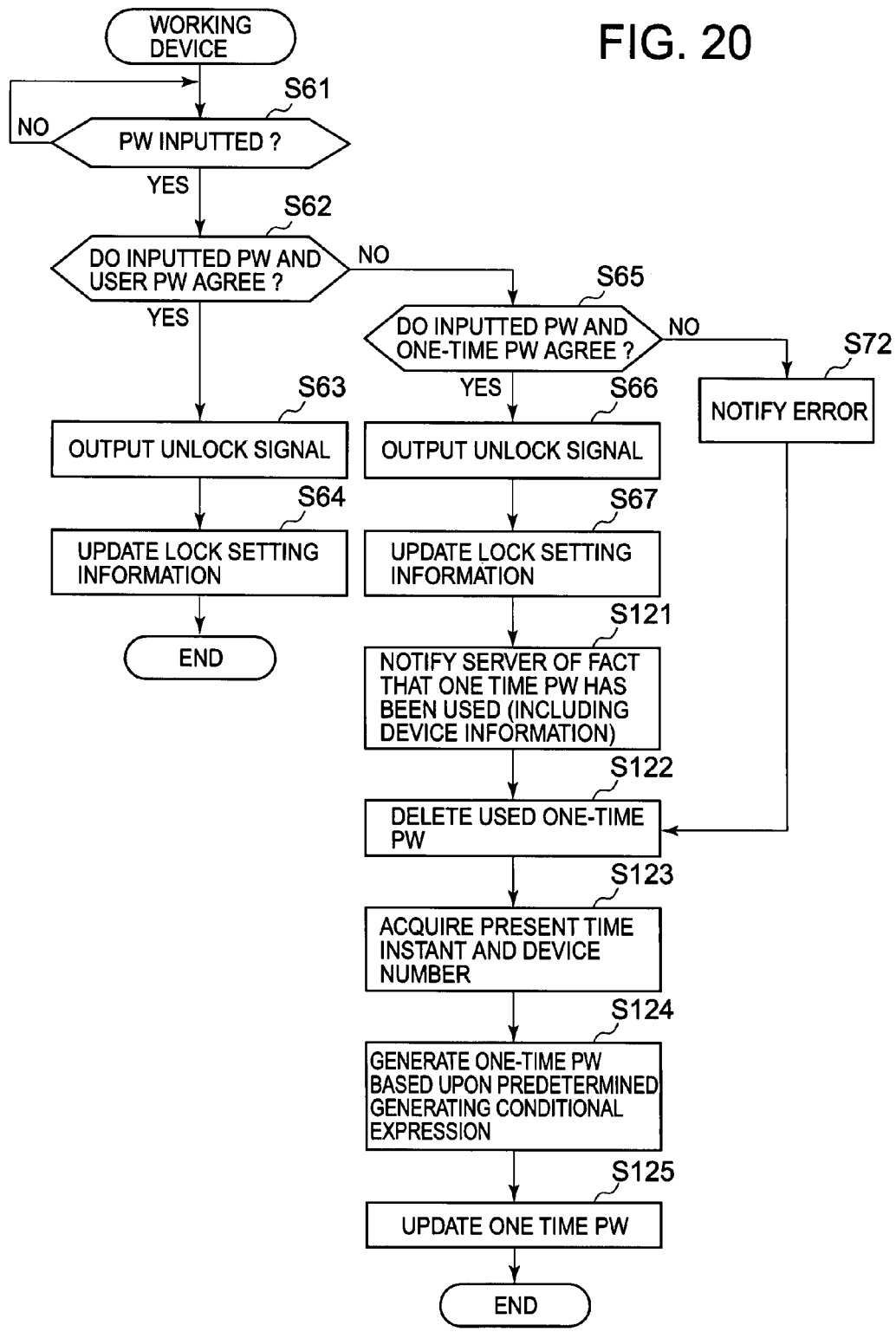
FIG. 20 is a flow chart showing unlock processing by local actuation.

FIG. 20 is a flow chart showing the unlock processing by local actuation in this embodiment. This flow chart has the steps S61 through S68 and S72 in common with the flow chart described together with FIG. 14. In the following explanation, in the same manner, explanation of common steps is curtailed, and the following explanation will focus upon the steps which are characteristic of this embodiment.

If the password which has been inputted via the input unit 152 and the one-time password which is stored in the one-time password storage unit 146 agree with one another (S65: YES), then the working machine 1 outputs an unlock signal (a step S66), and updates the lock setting information (a step S67). Next, the working machine 1 notifies the server 50, via the communication network 7, of the fact that the one-time password has been used (a step S121). The device number which is set for the working machine 1 is included in this usage notification.

After the working machine 1 has transmitted the usage notification to the server 50, it deletes the old one-time password which has been used and which is stored in the password storage unit 146 (a step S122).

Next the working machine 1, along with acquiring information as to the present time instant from the time instant information generation unit 148, also acquires the device number from the device number storage unit 149 (a step S123), and generates a new one-time password according to the above described generating conditional expression (a step S124).

And the working machine 1 stores this new one-time password which has been generated in the one-time password storage unit 146 (a step S125).

Now, if the password which has been inputted via the input unit 152 and the one-time password which is stored in the one-time password storage unit 146 do not agree with one another (S65: NO), then the working machine 1 notifies an error via the display unit 151 (a step S72). And, after this error has been notified, the flow of control is transferred to the step S122, and the working machine 1 executes the steps described above from this step S122.

That is to say, if ineffective information has been inputted to the input unit 152 which does not correspond either to an effective user password or to the one-time password, then updating processing for the one-time password is started, taking advantage of the input of this ineffective information as an opportunity (the steps S122 through S124). In other words, if ineffective information has been inputted, the one-time password which is stored in the one-time password storage unit 146 is deleted, and a new one-time password is updated and stored.

Accordingly, even if the user or the like has made a mistake in input of the one-time password, then, taking advantage of the input of this mistaken one-time password as an opportunity, a new one-time password is automatically generated and is stored in the one-time password storage unit 146.

Figure 21:
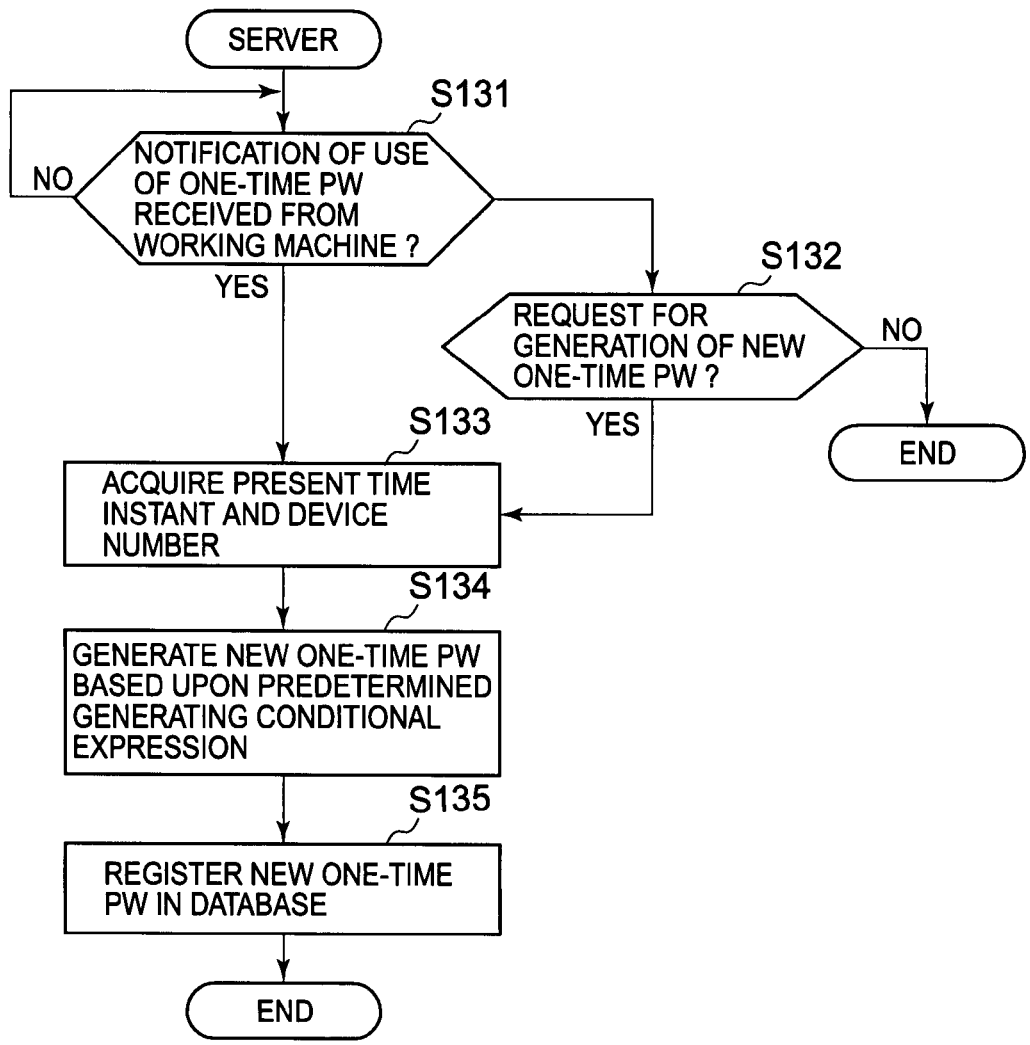
FIG. 21 is a flow chart showing processing by which a server generates a new one-time password.

FIG. 21 is a flow chart showing the processing by which the server 50 generates a new one-time password.

The server 50 decides (a step S131) whether or not a usage notification for the one-time password has been received from the working machine 1 (refer to S121 of FIG. 20). Furthermore, the server 50 decides whether or not the generation of a new one-time password has been requested (a step S132).

For example, the user or the like may request the generation of a new one-time password from the manager of the server 50 (a manager who has the authority to issue one-time passwords) via a communication means such as telephone, facsimile or electronic mail. Having confirmed this request, the manager is able to generate a new one-time password by a command to the server 50.

When either the server 50 has received a one-time password usage notification from the working machine 1 (S131: YES) or a request for generation of a one-time password has been inputted (S132: YES), a new one-time password is generated. That is to say, the server 50 acquires the present time instant and device number (a step S133), and generates a new one-time password according to the above described predetermined generating conditional expression (a step S134). And the server 50 stores this one-time password which has been newly generated in a data base in the storage unit 53 (a step S135).

The server may also incorporate a function of serving as a timer for generating the time instant information; or it may receive the newest time instant information from an external time server. In the same manner, it would also be acceptable to arrange for the working machine 1 as well to receive the newest time instant information from an external time server.

Figure 22:
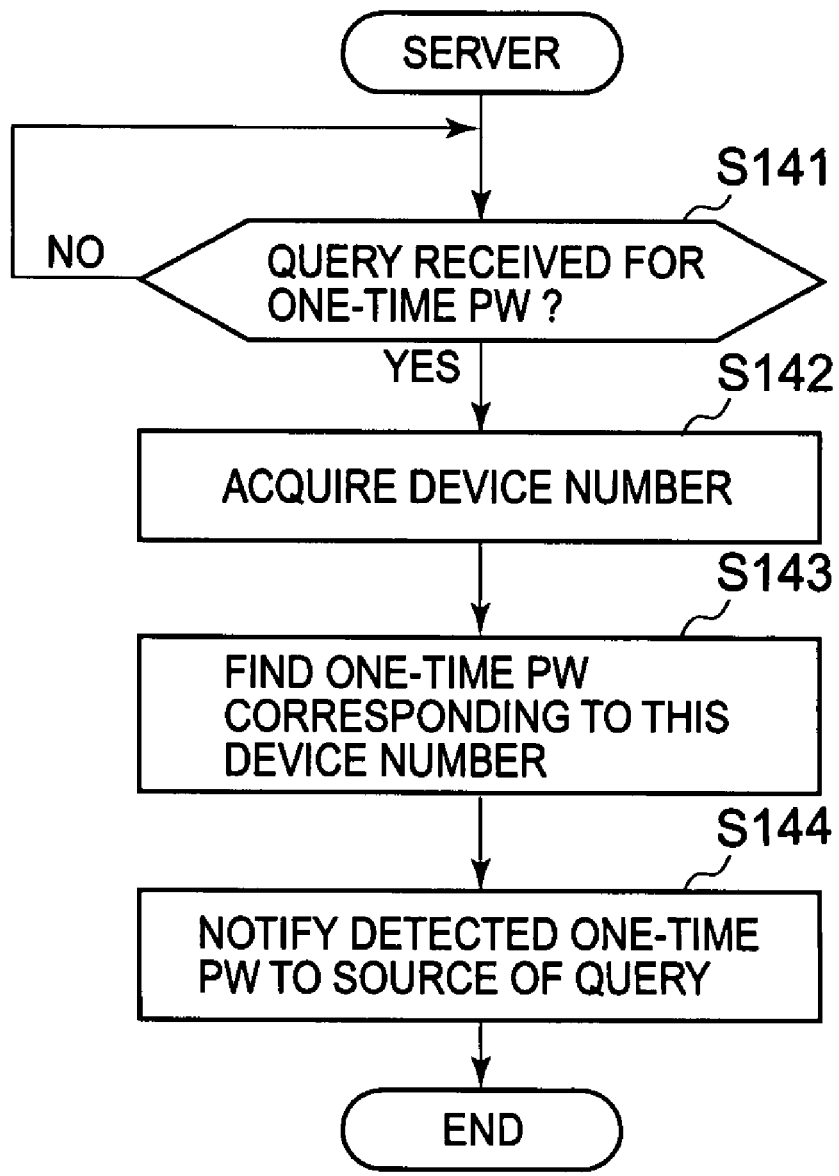

FIG. 22 is a flow chart showing the processing by which the newest one-time password is notified, according to a request from the user at his place of work or the like.

The server 50 decides whether or not the newest one-time password (in other words, the currently effective one-time password) has been queried (a step S141). At least a device number is included in a query request (an inquiry request) for the one-time password.

If a query for the one-time password is received (S141: YES), the server 50 acquires the device number (a step S142), and finds the one-time password which corresponds to this device number from the data base (a step S143). And the server 50 notifies this one-time password which has thus been detected to the user or the like who is the source of the query (a step S144).

Using an example to explain this in more concrete terms, for example, the user or the like queries the manager of the server 50 for the newest one-time password, via a means such as telephone or the like, along with informing him of the device number. After, for example, the manager has confirmed the identity of the user or the like who is the source of the query by the telephone number of the caller or the like, as shown by the flow chart of FIG. 21, the newest one-time password which corresponds to the device number which has been notified is generated, and is stored (the steps S132 through S133 and S134 of FIG. 21).

And the manager notifies the new one-time password which has been stored to the user or the like via a means such as telephone or the like. And the user or the like is able to release the locked state of the working machine 1 by inputting this one-time password which has thus been notified via the input unit 152.

As described above, the working machine 1 and the server 50 are built so as each to generate the one-time password using the same generating conditional expression, based upon the same fundamental information (the time instant information and the device number). Accordingly, the one-time password which is generated by the working machine 1 and the one-time password which is generated by the server 50 are the same.

In this embodiment, when the one-time password is used, each of the working machine 1 and the server 50 each generates its own one-time password. Accordingly, as compared with a structure in which a one-time password which has been generated by the server 50 is transmitted to and is stored by the working machine 1, as in a previous embodiment, it is possible to manage the one-time password more reliably, so that the level of security is enhanced.

Furthermore, in this embodiment, it is possible to alleviate the load upon the server 50, since there is no necessity for the server 50 to transmit the one-time password which has been newly generated to the working machine 1, and accordingly it is possible to allocate the performance of the server 50 to some other processing.

The embodiments described above are only examples for explanation of the present invention; the range of the present invention is not to be considered as being limited only by them. The present invention may be implemented in various ways other than the embodiments described above, provided that its gist is not departed from.

For example, it is not necessary for the UI unit 150 to be fixed within the driving chamber of the working machine 1; for example, it would be acceptable to provide a structure in which it is constituted as a portable terminal which is capable of short distance wireless communication, and, in that case, the operator or the like would be able to perform lock control by local actuation from the exterior of the main section of the working device 1.

The invention claimed is:

1. A system for performing lock control of a working machine, comprising a working machine and a management device which are connected via a communication network so as to be capable of mutual communication, wherein:
said working machine comprises:
an input means for inputting information;
a first communication means which performs mutual communication with said management device via said communication network; and
a control means which initiates lock control, where operation of said working machine is restricted, or releases said lock control, based upon either or both of remote actuation by information which has been inputted from said management device via said first communication means and local actuation by information which has been inputted from said input means; and
said management device comprises:
a second communication means which performs mutual communication with said working machine via said communication network;
a lock setting means which transmits a locking signal initiating said lock control, via said second communication means, to said working machine; and
a lock release means which transmits an unlocking signal to said working machine for releasing said lock control via said second communication means; and
said control means comprises:
a first password storage means which stores first password information which is a user password for comparison with information inputted from said input means;
a second password storage means which stores second password information which is a one-time password for comparison with information inputted from said input means; and
a third password storage means which stores third password information for comparison with information inputted from said management device; and
lock setting storage means identifying lock setting information comprising whether said lock control was set by said local actuation or said remote actuation;
wherein said working machine is under said lock control, and said control means:
releases said lock control, when said lock setting storage means identifies said lock setting information as being set by said local actuation and when said information inputted by local actuation from said input means matches said first password information or said second password information;
releases said lock control, when said lock setting storage means identifies said lock setting information as being set by said remote actuation and when said information inputted by said local actuation matches at least either one of said second password information and said third password information;
releases said lock control, when said lock setting storage means identifies said lock setting information as being set by said local actuation and when said information inputted by said remote actuation matches said third password information; and
prevents release of said lock control by local actuation, when said first password was reset by said remote actuation.

2. The lock control system for a working machine as described in claim 1, further comprising a second password rewriting means for, if said second password information which is stored in said second password storage means has been used, rewriting said used second password information to new second password information.

3. The lock control system for a working machine as described in claim 1, further comprising a second password deletion means for, if said second password information which is stored in said second password storage means has been used, deleting said used second password information.

4. The lock control system for a working machine as described in claim 1, wherein said control means comprises a second password rewriting means and, if said second password information which is stored in said second password storage means has been used, said second password rewriting means rewrites said used second password information to new second password information.

5. The lock control system for a working machine as described in claim 1, wherein
said control means comprises a second password deletion means and a second password rewriting means, and:
if said second password information which is stored in said second password storage means has been used, said second password deletion means deletes said used second password information; and
if an issuance request for said second password information has been inputted from said input means, said second password rewriting means generates new second password information according to a predetermined generating conditional expression which has been set in advance, and stores the new second password information in said second password storage means.

6. The lock control system for a working machine as described in claim 5, wherein said control means decides that the issuance request for said second password information has been inputted, if information other than information which is registered in advance in said control means has been inputted via said input means.

7. The lock control system for a working machine as described in claim 1, wherein:
said management device comprises a second password rewriting means; and
the second password rewriting means, upon receipt from said control means via said communication network of information to the effect that said second password information which is stored in said second password storage means has been used, generates new second password information, transmits the new second password information which has been generated via said communication network to said control means, and causes it to be stored in said second password storage means.

8. The lock control system for a working machine as described in claim 1, wherein:
said management device comprises:
a reset means for resetting said first password information which is stored in said first password storage means to its initial value; and
a second password rewriting means which updates said second password information which is stored in said second password storage means to new second password information;
and said control means:
based upon a command from said reset means, resets said first password information which is stored in said first password storage means to said initial value; and
based upon a command from said second password rewriting means, updates said second password information which is stored in said second password storage means to said new second password information.

9. The lock control system for a working machine as described in claim 1, wherein said control means, as said lock control, sets said working machine to either one of a locked state in which the operation of said working machine is made impossible or the operation which it is capable of executing is restricted, and an unlocked state in which this locked state is released.

10. The lock control system for a working machine as described in claim 1, wherein said first password information is information which can be repeatedly used at a plurality of times for said lock control, and said second password information is information which is changed at each time when said lock control is performed.

11. The lock control system for a working machine as described in claim 1, wherein said second password information is set to a position that is superior to said first password information and said third password information.

12. The lock control system for a working machine as described in claim 1, wherein,
 said second password information is set as a highest priority,
 said third password information is set as a second priority, and
 said first password information is set as a third priority.

* * * * *